United States Patent
Nambord et al.

(10) Patent No.: US 9,312,921 B2
(45) Date of Patent: Apr. 12, 2016

(54) RETRIEVING/AUTHORIZING CONTENT ON USER EQUIPMENT BASED ON INFORMATION FROM CONNECTABLE ACCESSORY WITH NFC CIRCUIT

(71) Applicant: Sony Corporation, Tokyo (JP)

(72) Inventors: Magnus Nambord, Lund (SE); Emil Hansson, Lund (SE)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/461,954

(22) Filed: Aug. 18, 2014

(65) Prior Publication Data
US 2015/0244421 A1 Aug. 27, 2015

Related U.S. Application Data

(60) Provisional application No. 61/942,716, filed on Feb. 21, 2014.

(51) Int. Cl.
| | |
|---|---|
| H04B 5/00 | (2006.01) |
| H04M 1/11 | (2006.01) |
| H04W 12/00 | (2009.01) |
| H01Q 7/00 | (2006.01) |
| H02J 7/02 | (2006.01) |
| H04W 12/06 | (2009.01) |

(52) U.S. Cl.
CPC ............... *H04B 5/0025* (2013.01); *H01Q 7/00* (2013.01); *H02J 7/025* (2013.01); *H04B 5/0031* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,537,907 B2 | 9/2013 | Sung | |
| 2008/0291852 A1 | 11/2008 | Abel | |
| 2008/0303632 A1 | 12/2008 | Hammad | |
| 2010/0007467 A1 | 1/2010 | Breitfuss et al. | |
| 2010/0068996 A1 | 3/2010 | Haartsen | |
| 2012/0044059 A1* | 2/2012 | Saros et al. | 340/10.5 |
| 2012/0137310 A1 | 5/2012 | Teruyama | |

(Continued)

FOREIGN PATENT DOCUMENTS

EP 2 608 577 A1 6/2013

OTHER PUBLICATIONS

ECMA International, Near Field Communication Interface and Protocol (NFCIP-1), Standard ECMA-340, $2^{nd}$ Edition, Dec. 2004, 60 Pagess.

ECMA International, Near Field Communication Interface and Protocol (NFCIP-1), Standard ECMA-340, 3rd Edition, Jun. 2013, 52 Pages.

(Continued)

*Primary Examiner* — Philip Sobutka

(74) *Attorney, Agent, or Firm* — Myers Bigel & Sibley, P.A.

(57) ABSTRACT

An accessory for a user equipment (UE) is disclosed that includes a housing configured to be connected to the UE and accessory near field communication (NFC) circuit attached to the housing. The accessory NFC circuit includes an antenna, a charging circuit, and a transceiver circuit. The antenna is configured to inductively couple to signals emitted by a UE NFC circuit within the UE. The charging circuit is configured to output power provided by the inductive coupling through the antenna to the signals emitted by the UE NFC circuit. The transceiver circuit is configured to be powered by the charging circuit to transmit information to the UE NFC circuit that will be used by the UE to retrieve content stored on a content server and/or to authorize use of content stored on the UE. Related UEs and methods are disclosed.

21 Claims, 14 Drawing Sheets

(56) References Cited

U.S. PATENT DOCUMENTS

| | | | |
|---|---|---|---|
| 2012/0311723 A1* | 12/2012 | Britt et al. | 726/28 |
| 2012/0315845 A1 | 12/2012 | Buczek | |
| 2013/0072114 A1 | 3/2013 | Abhyanker | |
| 2013/0084800 A1 | 4/2013 | Troberg | |
| 2013/0124186 A1 | 5/2013 | Donabedian et al. | |
| 2013/0223631 A1 | 8/2013 | Greuet et al. | |
| 2013/0225077 A1 | 8/2013 | Schultz et al. | |
| 2013/0333055 A1* | 12/2013 | Pallakoff et al. | 726/29 |
| 2013/0344805 A1 | 12/2013 | Lefley | |
| 2014/0120905 A1 | 5/2014 | Kim | |
| 2014/0156791 A1* | 6/2014 | Sant et al. | 709/217 |
| 2015/0024683 A1 | 1/2015 | Hussain | |
| 2015/0026296 A1* | 1/2015 | Halpern | 455/41.1 X |

OTHER PUBLICATIONS

International Search Report and Written Opinion Corresponding to International Application No. PCT/JP2014/004900; Date of Mailing: Jan. 23, 2015; 14 pages.

International Search Report and Written Opinion Corresponding to International Application No. PCT/JP2014/004899; Date of Mailing: Jan. 23, 2015; 11 Pages.

International Search Report and Written Opinion Corresponding to International Application No. PCT/JP2014/004901; Date of Mailing: Jan. 28, 2015; 12 Pages.

NFC Forum, NFC Digital Protocol Technical Specification NFC Forum, Nov. 17, 2010; 194 Pages, Retrieved from the internet at URL http://cwi.unik.no/images/NFC_forum_digital_protocol.pdf.

* cited by examiner

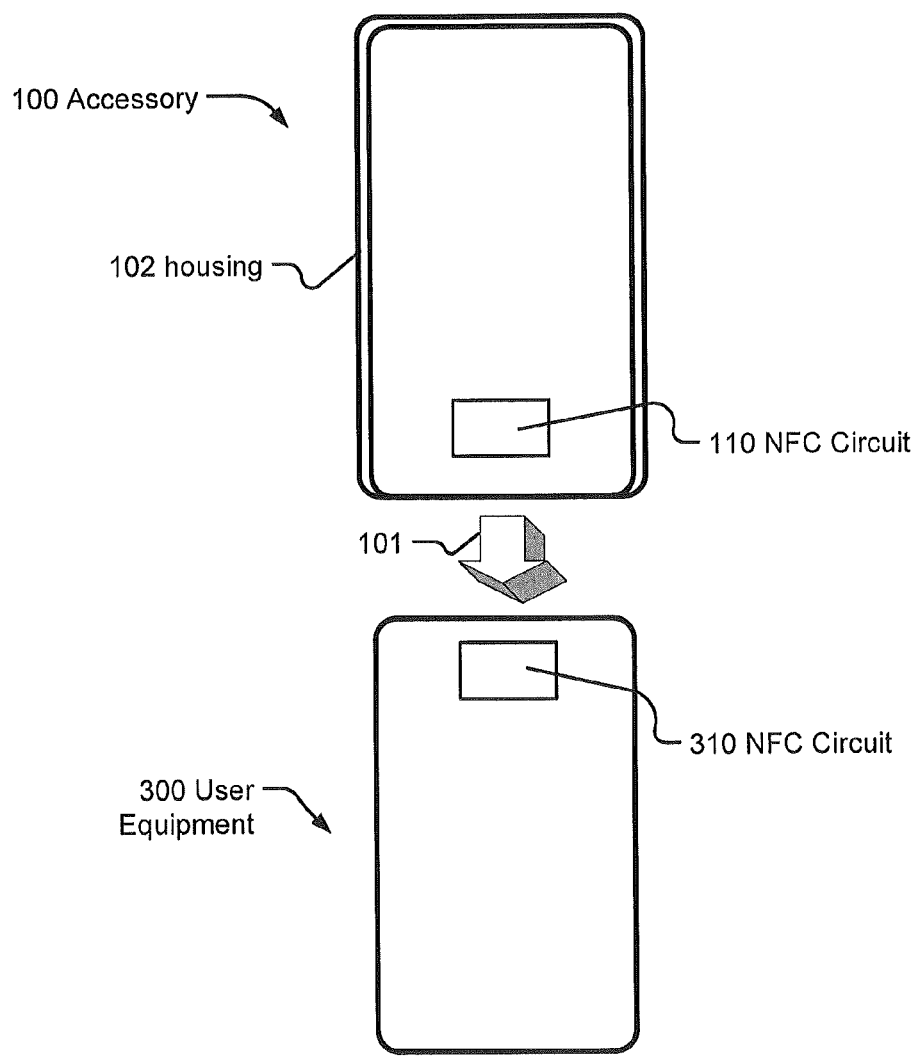
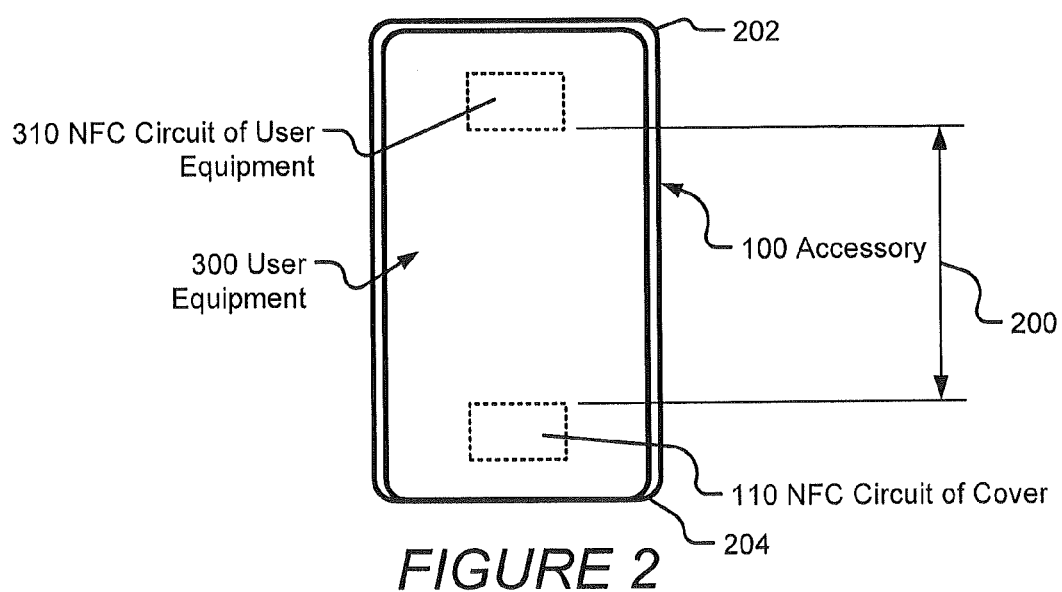
FIGURE 1
FIGURE 2

Transmit information to the UE NFC circuit that will be used by the UE to retrieve content stored on a content server and/or to authorize use of content stored on the UE — 1100

FIGURE 11

Transmit information to the UE NFC circuit which contains a universal resource locator (URL) address that will be used by the UE to retrieve content stored on the content server at a location defined by the URL address — 1200

FIGURE 12

Transmit information to the UE NFC circuit which contains authorization information (and may contain accessory specific ID) to the UE NFC circuit that can be relayed by the UE to the content server to confirm that the UE is authorized to obtain the content — 1300

FIGURE 13

Transmit information to the UE NFC circuit which contains an accessory specific identifier (ID) to the UE NFC circuit to authorize use of content stored on the UE — 1400

FIGURE 14

Transmit the information to the UE NFC circuit which the UE can use to retrieve a discount coupon from the content server and/or to authorize use of a discount coupon stored on the UE for use during an online purchase from the online retailer — 1500

FIGURE 15

Select a universal resource locator (URL) address from among a group of URL addresses defined in the accessory based on a count of power-on cycles and/or to select an activation code from among a group of activation codes defined in the accessory based on the count — 1600

Transmit the selected URL address and/or the selected activation code to the UE NFC circuit that will be used by the UE to retrieve content stored on the content server and/or authorize use of content stored on the UE — 1602

FIGURE 16

Transmit a first universal resource locator (URL) address and/or to transmit a first activation code when the count satisfies a defined relationship to a threshold value, and transmit a second URL address different from the first URL address and/or transmit a second activation code different from the first activation code when the count does not satisfy the defined relationship to the threshold value — 1700

FIGURE 17

Transmit the information when the count satisfies a defined relationship to a threshold value and to prevent transmission of the information when the count does not satisfy the defined relationship to the threshold value — 1800

*FIGURE 18*

Select a universal resource locator (URL) address from among a group of URL addresses based on a count of how many different UEs have obtained information from the accessory NFC circuit and/or to select an activation code from among a group of activation codes based on the count — 1900

Transmit the selected URL address and/or the selected activation code to the UE NFC circuit that will be used by the UE to retrieve content stored on the content server and/or to authorize use of content stored on the UE — 1902

*FIGURE 19*

Transmit a first universal resource locator (URL) address and/or transmit a first activation code when a count of power-on cycles satisfies a defined relationship to a threshold value, and transmit a second URL address different from the first URL address and/or transmit a second activation code different from the first activation code when the count does not satisfy the defined relationship to the threshold value — 2000

*FIGURE 20*

2500 — Revoke authorization of use of the content responsive to detecting an inability of the UE NFC circuit to communicate with the accessory NFC circuit

FIGURE 25

2600 — Count a number of different accessory NFC circuits that it has received information from 2602 — Select a universal resource locator (URL) address from among a group of URL addresses available in the UE based on the count 2604 — Use the selected URL address to retrieve through the network interface content stored on the content server at a location defined by the URL address

FIGURE 26

2700 — Count a number of different accessory NFC circuits that it has received information from 2702 — Select an activation code from among a group of activation codes available in the UE based on the count 2704 — Use the selected activation code to authorize use of content stored on the UE

FIGURE 27

RETRIEVING/AUTHORIZING CONTENT ON USER EQUIPMENT BASED ON INFORMATION FROM CONNECTABLE ACCESSORY WITH NFC CIRCUIT

CROSS REFERENCE TO RELATED APPLICATION

This application claims priority to U.S. provisional Patent Application No. 61/942,716, filed 21 Feb. 2014, the disclosure and content of which is incorporated by reference herein in its entirety.

TECHNICAL FIELD

The present invention relates to wireless communication user equipment and, more particularly, to mobile phones and related accessories such as covers that are attachable to mobile phones.

BACKGROUND

Cell phones and other user equipment can be customized with applications, features, music, books, movies, and other content that is downloadable from on-line servers. Because many types of user equipment operate within a closed environment in which content downloaded from an authorized server (e.g., Apple application store, Android Marketplace store, etc), it can be difficult for a business to provide downloadable content to a person's user equipment. Moreover, the business would have difficulty controlling which persons and user equipment are allowed to receive the downloadable content from the authorized server. For example, downloadable content containing discount coupons or authorization codes are subject to theft and unauthorized transfer between persons.

SUMMARY

One embodiment of the present disclosure is directed to an accessory for a user equipment (UE). The accessory includes a housing configured to be connected to the UE and an accessory near field communication (NFC) circuit attached to the housing. The accessory NFC circuit includes an antenna, a charging circuit, and a transceiver circuit. The antenna is configured to inductively couple to signals emitted by a UE NFC circuit within the UE. The charging circuit is configured to output power provided by the inductive coupling through the antenna to the signals emitted by the UE NFC circuit. The transceiver circuit is configured to be powered by the charging circuit to transmit information to the UE NFC circuit that will be used by the UE to retrieve content stored on a content server and/or to authorize use of content stored on the UE.

In a related embodiment the housing forms a cover configured to protect a surface of the UE and/or forms a stand that supports and holds the UE in a defined orientation.

In some further embodiments the transceiver circuit is configured to transmit the information containing a universal resource locator (URL) address that will be used by the UE to retrieve content stored on the content server at a location defined by the URL address. The accessory transceiver circuit may transmit authorization information to the UE NFC circuit that can be relayed by the UE to the content server to confirm that the UE is authorized to obtain the content. The authorization information may include an accessory specific identifier (ID) that is unique from other accessory NFC circuits and that can be relayed by the UE to the content server to confirm that the UE is authorized to obtain the content.

The transceiver circuit may be configured to transmit the information containing an accessory specific ID to the UE NFC circuit to authorize use of content stored on the UE.

The housing may display visible branding relating to an online retailer or business partner thereof. The transceiver circuit may transmit the information to the UE NFC circuit which the UE can use to retrieve a discount coupon from the content server and/or to authorize use of a discount coupon stored on the UE for use during an online purchase from the online retailer.

The accessory NFC circuit further can include a counter configured to count power-on cycles of the accessory NFC circuit. The transceiver circuit may select a URL address from among a group of URL addresses defined in the accessory NFC circuit based on the count and/or select an activation code from among a group of activation codes defined in the accessory NFC circuit based on the count. The transceiver circuit may then transmit the selected URL address and/or the selected activation code to the UE NFC circuit for use by the UE to retrieve content stored on the content server and/or authorize use of content stored on the UE.

In a related embodiment the accessory NFC circuit includes a counter configured to count power-on cycles of the accessory NFC circuit. The transceiver circuit is configured to transmit a first URL address and/or to transmit a first activation code when the count satisfies a defined relationship to a threshold value, and to transmit a second URL address different from the first URL address and/or transmit a second activation code different from the first activation code when the count does not satisfy the defined relationship to the threshold value.

In a related embodiment the accessory NFC circuit includes a counter configured to count power-on cycles of the accessory NFC circuit. The transceiver circuit is configured to transmit the information when the count satisfies a defined relationship to a threshold value and to prevent transmission of the information when the count does not satisfy the defined relationship to the threshold value.

In a related embodiment, the accessory NFC circuit includes a counter configured to count a number of different UEs that have powered the accessory NFC circuit to obtain information transmitted by the transmitter. The transceiver circuit is configured to select a URL address from among a group of URL addresses based on the count and/or to select an activation code from among a group of activation codes based on the count. The transceiver circuit transmits the selected URL address and/or the selected activation code to the UE NFC circuit that will be used by the UE to retrieve content stored on the content server and/or to authorize use of content stored on the UE.

In a related embodiment, the accessory NFC circuit includes a counter configured to count a number of different UEs that have powered the accessory UE to obtain information transmitted by the transmitter. The transceiver circuit is configured to transmit a first URL address and/or to transmit a first activation code when the count satisfies a defined relationship to a threshold value, and to transmit a second URL address different from the first URL address and/or to transmit a second activation code different from the first activation code when the count does not satisfy the defined relationship to the threshold value.

In a related embodiment, the accessory NFC circuit includes a counter configured to count a number of different UEs that have powered the accessory UE to obtain information transmitted by the transmitter. The transceiver circuit is configured to selectively transmit the information depending upon the count satisfying a defined relationship to a threshold value.

Some other embodiments are directed to a UE that includes a UE NFC circuit, a network interface, and a processor. The UE NFC circuit is configured to receive information from an accessory NFC circuit while providing power to the accessory NFC circuit through inductive coupling. The network interface is configured to communicate with a network node. The processor is configured to use the information to retrieve through the network interface content stored on a content server and/or to authorize use of content stored on the UE, and to control operation of the UE responsive to the content.

In a related embodiment the information received by the UE NFC circuit from the accessory NFC circuit contains a URL address, and the processor uses the URL address to retrieve content stored on the content server at a location defined by the URL address.

In a related embodiment the information received by the UE NFC circuit from the accessory NFC circuit contains an accessory specific ID, and the UE processor uses the accessory specific ID to authorize use of content stored on the UE. The processor may be configured to revoke authorization of use of the content responsive to detecting an inability of the UE NFC circuit to communicate with the accessory NFC circuit.

In a related embodiment, the processor is configured to count a number of different accessory NFC circuits that it has received information from, and to select a URL address from among a group of URL addresses available in the UE based on the count. The processor then uses the selected URL address to retrieve through the network interface content stored on the content server at a location defined by the URL address.

In a related embodiment, the UE processor is configured to count a number of different accessory NFC circuits that it has received information from, and to select an activation code from among a group of activation codes available in the UE based on the count. The UE processor then uses the selected activation code to authorize use of content stored on the UE.

In a related embodiment, the UE NFC circuit receives information from a plurality of different accessory NFC circuits. The UE processor is configured to generate a URL address based on a combination of the information received from the plurality of different accessory NFC circuits, and to use the URL address to retrieve content stored on the content server at a location defined by the URL address.

In a related embodiment, the UE NFC circuit receives information from a plurality of different accessory NFC circuits. The UE processor is configured to generate an activation code based on a combination of the information received from the plurality of different accessory NFC circuits, and to use the activation code to authorize use of content stored on the UE.

In a related embodiment, the UE processor is configured to count a number of different accessory NFC circuits that it has received information from. The UE processor prevents use of content stored on the UE responsive to the count not satisfying a defined relationship to a threshold value and allows use of content stored on the UE responsive to the count satisfying the defined relationship to the threshold value.

Other accessories for user equipment, user equipment, systems, and methods according to other embodiments will be or become apparent to one with skill in the art upon review of the following drawings and detailed description. It is intended that all such additional accessories for user equipment, user equipment, systems, and methods be included within this description, be within the scope of the present invention, and be protected by the accompanying claims.

BRIEF DESCRIPTION OF THE DRAWINGS

Aspects of the present disclosure are illustrated by way of example and are not limited by the accompanying drawings. In the drawings:

FIG. 1 illustrates an accessory, such as a cover or stand, that is attachable to a user equipment, where each has a NFC circuit according to some embodiments;

FIG. 2 illustrates the accessory attached in a stored position relative to the user equipment of FIG. 1 according to some embodiments;

FIGS. 11-21 illustrate flowcharts of operations and methods that may be performed by a NFC circuit in accordance with some embodiments; and FIG. 22-30 illustrate flowcharts of operations and methods that may be performed by a user equipment in accordance with some embodiments.

DETAILED DESCRIPTION

Figure 3:
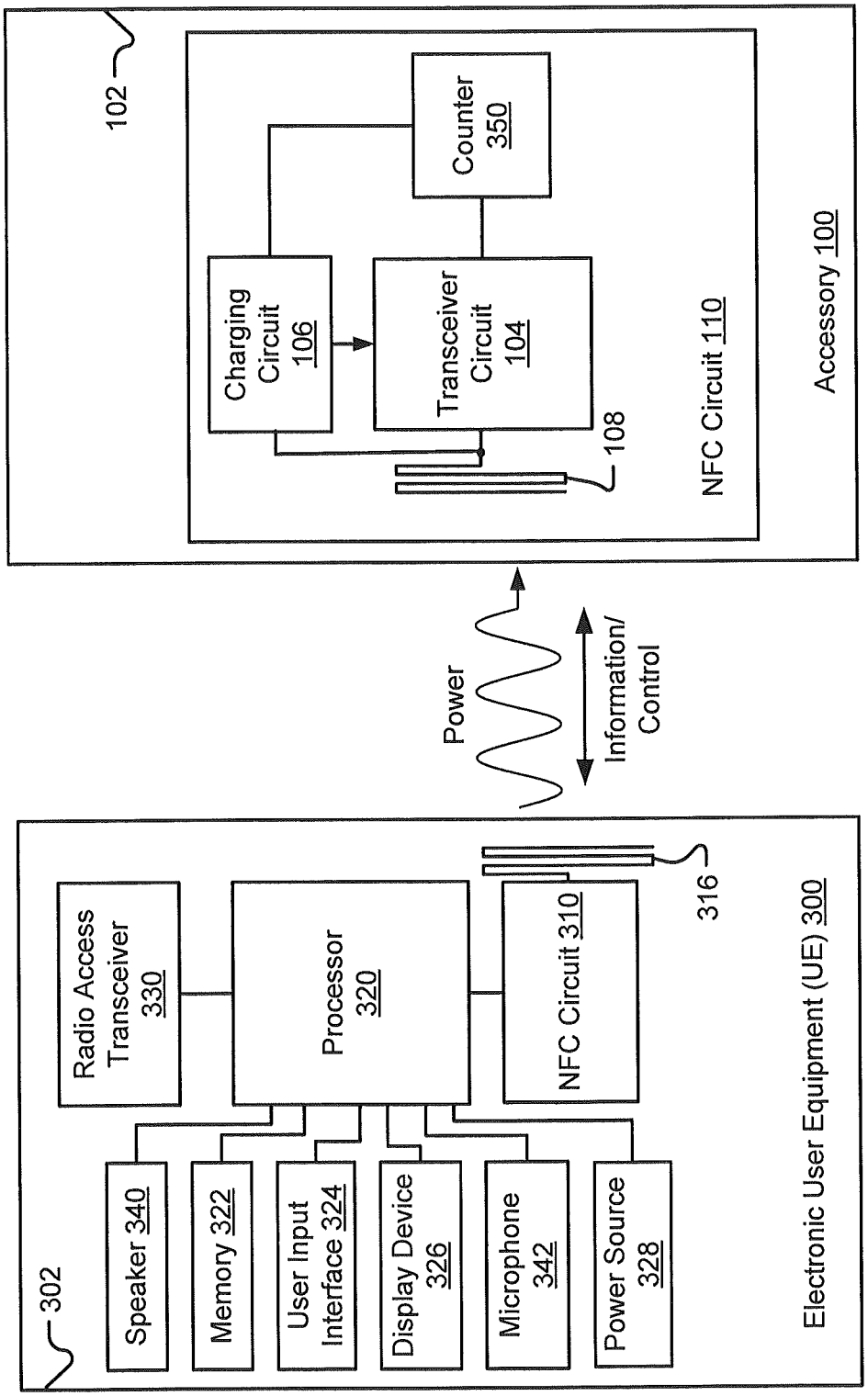
FIG. 3 is a block diagram of components of an accessory and a user equipment which both have NFC circuits configured according to some embodiments.

In the following detailed description, numerous specific details are set forth in order to provide a thorough understanding of embodiments of the invention. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to an accessory for a user equipment ("UE"). FIG. 1 illustrates an accessory 100 that is configured according to some embodiments for use with a UE 300. The accessory 100 includes a housing 102 that slides (e.g., along direction 101) on the UE 300 to become attached in a stored position relative to the UE 300. FIG. 2 illustrates the accessory 100 attached in a stored position relative to the UE 300 of FIG. 1 according to some embodiments. Although some embodiments of the accessory 100 are described as being configured to slide-on the UE 300, other embodiments may snap on, adhesively connect to, or otherwise maintain contact with or NFC communication range with the UE 300.

In one embodiment, the housing 102 has raised edge surfaces along at least two sides that form a central recessed surface area that extends to a recessed end of the housing to receive the UE 300 slid through the recessed end of the housing toward the stored position where the raised edge surfaces engage and retain the UE 300 in the stored position.

The accessory 100 may be a cover that, for example, protects a back surface of the UE 300, or a stand, such as a handsfree phone accessory, that supports and holds the UE 300 in a defined orientation. The UE 300 may be a cellular phone, a tablet computer, a palmtop computer, a mobile music/video player, or any other electronic device.

The accessory 100 has a NFC circuit 110, which is referred to as the "accessory NFC circuit 110", that is located on the housing 102, and may be at least partially disposed within the housing 102 or reside entirely within the housing 102. The UE 300 has another NFC circuit 310, which is referred to as the "UE NFC circuit 310". Thus, depending upon the proximity and configuration of the NFC circuits 110 and 310 while the accessory 100 is attached in the stored position relative to the UE 300, the accessory NFC circuit 110 may interfere with the ability of the UE NFC circuit 310 to communicate with a NFC circuit of a targeted device, such as a point of sale credit card processing terminal, a NFC tag on a product, which a user is attempting to communicate with through the UE 300.

For example, absent use of various embodiments disclosed herein, the accessory NFC circuit 110 could be positioned between the UE NFC circuit 310 and the NFC circuit of the targeted device, and located much closer to the UE NFC circuit 310 than the NFC circuit of the targeted device. Transmissions from the accessory NFC circuit 110 may thereby undesirably interfere (collide) with transmissions from the targeted device, and prevent reliable receipt by the UE 300 of data from the NFC circuit of the targeted device.

However, in accordance with some embodiments disclosed herein, the accessory NFC circuit 110 is attached at a location on the housing 102 and configured to be powered by inductive coupling to signals emitted by the other NFC circuit 310 within the UE 300 to temporarily operate to transmit data to the UE NFC circuit 310 as the accessory NFC circuit 110 passes over the UE NFC circuit 310 while the housing 102 is being slid on the UE 300 before reaching the stored position relative to the UE 300.

In some further embodiments, the accessory NFC circuit 110 becomes powered by inductive coupling to signals emitted by the UE NFC circuit 310 to temporarily operate to transmit data to the UE NFC circuit 310 as the accessory NFC circuit 110 passes over the UE NFC circuit 310 while the housing 102 is being slid off the UE 300. Furthermore, while the housing 102 is in the stored position relative to the UE 300, the accessory NFC circuit 110 is inhibited or prevented from transmitting data to the UE NFC circuit 310 irrespective of whether the UE NFC circuit 310 is emitting signals to attempt to provide inductive coupling to the accessory NFC circuit 110.

While the housing 102 is in the stored position relative to the UE 300, the accessory NFC circuit 110 is too remotely located from the UE NFC circuit 310 to be sufficiently powered by any inductive coupling to signals emitted by the UE NFC circuit 310 to operate the transmit data, according to one embodiment. For example, as shown in the embodiment of FIG. 2, the housing 102 has a top 202 that is adjacent an ear speaker 340 (FIG. 3) of the UE 300 and a bottom 204 that is adjacent a microphone 342 (FIG. 3) of the UE 300 while the housing 102 is in the stored position relative to the UE 300. The accessory NFC circuit 110 is located adjacent the bottom of the housing 102 and spaced apart by distance 200 to be remote from the UE NFC circuit 310 located adjacent the ear speaker of the UE 300. A location where the accessory NFC circuit 110 is fixed to the accessory 100 can be selected to provide sufficient communication isolation between the NFC circuits 110 and 310 to inhibit or prevent data transmission by the accessory NFC circuit 110 while the housing 102 is in the stored position relative to the UE 300.

FIG. 3 is a block diagram of components of the accessory 100 and the UE 300 that are connectable and configured to operate according to some embodiments. The UE 300 can include a housing 302, a processor circuit 320, a radio access transceiver 330, a NFC circuit 310, a memory device(s) 322, a display device 326, a user input interface 324 (e.g., touch sensitive interface for the display device 326, keypad/keyboard, button(s)/switch(es), etc.), a power source 328 (e.g., rechargeable battery) that supplies power to these and other components, a speaker 340, and a microphone 342. The radio access transceiver 330 may include, but is not limited to, a LTE or other cellular transceiver, Bluetooth transceiver, WiFi transceiver, WiMax transceiver, or other communication transceiver is configured to communicate with a network node of a telecommunications system. The processor 320 may include one or more data processing circuits, such as a general purpose and/or special purpose processor, such as a microprocessor and/or digital signal processor. The processor 320 is configured to execute computer program instructions from functional modules in the memory 322, described below as a computer readable medium, to perform at least some of the operations and methods described herein as being performed by a user equipment.

The accessory 100 includes a NFC circuit 110 (e.g., accessory NFC circuit) that can be powered by and communicate with the UE NFC circuit 310 using short-range high frequency wireless communication technology which enables the exchange of data between devices over about a 10 cm distance, although the NFC circuits 110 and 310 are not limited to operating in any defined range. The communication protocol and operation can be an extension of the ISO 14443 proximity-card standard (e.g., contactless card, RFID) and can be specified in the ECMA-340 and ISO/IEC 18092 technology standards. Some embodiments of the NFC circuits 110 and 310 may communicate using existing ISO 14443 smartcards and readers and can thereby be compatible with existing contactless communication infrastructure.

The NFC circuits 110 and 310 may communicate via magnetic field induction. A loop antenna 316 connected to the NFC circuit 310 and a loop antenna 108 of the accessory NFC circuit 110 are placed in close proximity to each other within the other's antenna near field, thereby effectively forming an air-core transformer. Some embodiments of the NFC circuits 110 and 310 can transmit within the globally available and unlicensed radio frequency ISM band of 13.56 MHz, with a bandwidth of almost 2 MHz. Some embodiments of the NFC circuits 110 and 310 can support data rates of 106, 212, or 424 kbit/s using a modified Miller coding or Manchester coding to encode and decode communicated data.

The accessory NFC circuit 110 can be configured to operate in a passive communication mode, because the accessory 100 does not have its own power source. In contrast, the UE NFC circuit 310 can be configured to operate in an active communication mode because of the power source 322 (FIG. 3), e.g., rechargeable battery, of the UE 300. When operating in the passive communication mode, the UE NFC circuit 310 provides a carrier field and the accessory NFC circuit 110 answers by modulating the carrier field. In this mode, the accessory NFC circuit 110 generates its operating power from the NFC circuit 310 provided electromagnetic field, thus making the accessory NFC circuit 110 a transponder. In some other embodiments the accessory NFC circuit 110 contains a power supply and is configured to operate in an active communication mode.

The NFC circuit 110 includes a charging circuit 106 that can become inductively coupled to the UE NFC circuit 310 through the antenna 108 to generate power therefrom, and which it provides to a transceiver circuit 104. The transceiver circuit 104 transmits data through the antenna 108 to the UE NFC circuit 310 using the power from the charging circuit 106. The transceiver circuit 104 may optionally be configured to receive data through the antenna 108 from the UE NFC circuit 310.

After an initial receipt and use of information from the accessory NFC circuit 110, the UE 300 may be configured to subsequently ignore information from the accessory NFC circuit 110 to avoid interference with communications between the NFC circuit 310 of the UE 300 and other NFC devices.

As will be explained below, in some embodiments the accessory NFC circuit 110 includes a counter that can be used to control the type of information that is transmitted and/or to control timing for when information is transmitted.

Using NFC Enabled Accessories to Provide Movies, Music, Games, Books, Promotional Information, Coupons, and Other Content NFC enabled accessories for UEs can be sold or otherwise provided to consumers to provide applications that are executable by the UEs, activate operational features of the UEs, and/or to provide other content to the UE. The content may include, for example, movies, music (e.g., songs, ring tones, etc.), electronic books, television programs, games, discount coupons, promotional information, etc. Activating of a feature provides an indication that the features is authorized to be executed or otherwise used on the UE.

A movie studio may sell or otherwise provide movie themed covers or other accessories for UEs. The accessories can include a NFC circuit which transmits information that is used by the UE to obtain content from a content server and/or to unlock/activate content that may already reside on the UE that relates to the movie. For example, a NFC circuit may transmit information that contains a universal resource locator (URL) address to particular content stored on a content server, which is accessible through a data network, that can be retrieved by downloading/streaming the movie, music relating to the movie, background display image(s) relating to the movie, promotional information relating to the movie, discount that can be redeemed to purchase or temporarily view the movie, etc. A business may therefore work with a content provider to make content available through a network content server (e.g., a cloud service server), and can configure an accessory NFC circuit to transmit a URL to the location of the content stored on the server. The accessory NFC circuit may further transmit authorization information that can be used by the server to confirm that a UE requesting access to the content is indeed authorized to obtain such access through use of the accessory NFC circuit.

Other covers/accessories can be provided by music promoters, game developers, sports teams, and/or retail businesses that include a NFC circuit 110 which transmits information that is used by the UE to obtain content from a content server and/or to unlock/activate content that may already reside on the UE relating. For example, the NFC circuit 110 may transmit information that contains a URL to particular content stored on a content server, which is accessible through a data network, that can be retrieved by downloading/streaming the music or game, photographic image(s) relating to the music/game/business, promotional information relating to the music/game/business, discount that can be redeemed to purchase or temporarily access the music/game, and/or that can be used when purchasing through the business.

The information may contain a URL that points to server location that can provide a plurality of content themes that can be provided to the UE, contain a theme ID that specifies a particular content theme that can be provided to the UE, and/or contain a unique ID, such as an ID that is unique from other accessory NFC circuits, that is used to obtain a user/UE specific license to content.

For example, an online retailer may sell or otherwise provide phone covers having visible, e.g., printed, branding relating to the online retailer or partner thereof and including a NFC circuit which transmits information that can be used by the UE to download a retail application from a content server, and which may further provide a discount coupon that be used when purchasing through the online retailer. By way of another example, a restaurant may sell or otherwise provide phone covers having visible branding relating to the restaurant and/or a business partner, e.g., a movie studio, music artist, sports team, etc. being promoted by the restaurant, and which provides a URL to a location on a content server having promotional information relating to the restaurant and/or the business partner. Other business models that may beneficially use NFC enabled accessories to provide content to users can include sponsorship businesses, charitable businesses, telecommunication provider businesses, movie studios/distributors, music studios/distributors, and retailers. The NFC enabled accessories can encourage and facilitate collaborative business relationships between accessory manufacturers, UE manufacturers, UE operators, and/or content providers to distribute content through UEs for use by targeted users.

Information received by a UE from the cover NFC circuit may provide a limited duration license, a limited number of use license, a partially paid-up subscription-based license, or a fully paid-up perpetual license for use of defined content on the UE. A content license may require continuing presence of the cover NFC circuit, such that removal of the cover from the UE automatically terminates the license and disables use of the content. The cover NFC circuit may thereby control licensing of content.

In the embodiment of FIG. 3, the UE 300 can communicate information through the radio access transceiver 330 to a content server to, for example, download an application program for execution by the processor 320 of the UE 300. The UE 300 may obtain from the content server text, graphics, photographic images (e.g., background display wallpaper, locked screen display wallpaper, etc.), an electronic book, movie, television program, and/or other content for display on the display device 326 of the UE 300, and/or music (e.g., song, ringtone, etc.) or other audio content to be played through the speaker 340 of the UE 300. In a further embodiment, the accessory NFC circuit 110 transmits a product code or other information to the UE NFC circuit 310 that activates functionality within the user equipment 300. The UE 300 may communicate through the radio access transceiver 330 to the content server to, for example, obtain an activation code for an application hosted by the UE 300.

In some other embodiments, the accessory NFC circuit 110 is pre-programmed with content that can be transmitted to the UE 300. Text, a digital image, an executable program, an electronic book, a television program, a movie, or other content may be pre-programmed into a non-volatile memory of the accessory NFC circuit 110 and transferred to the UE 300 in parts as-needed (e.g., streamed) or in whole (e.g., file transfer).

In some other embodiments, the UE 300 writes content to the accessory NFC circuit 110 for storage in a non-volatile memory of the accessory NFC circuit 110. The UE 300 may download the content from a content server through a data network for relay transmission to the accessory NFC circuit 110 for storage and/or may retrieve the content from the local memory 322 for transmission to the accessory NFC circuit 110 for storage. The accessory NFC circuit 110 may thereby be used as an external back-up memory for defined content on the UE 300 and/or may be used as a way to transfer or otherwise share defined content between two or more UEs 300.

Controlling Activation of Accessory NFC Circuit

As explained above, NFC enabled covers for UEs can be sold to consumers to provide applications that are executable by the UEs, activate operational features of the UEs, and/or to provide other content to the UE. Because activation of the accessory NFC circuit 110 causes transmission of information that can be used to obtain applications, movies, music, and other proprietary and valuable content, it can be important to control who obtains such information. For example, it is envisioned that NFC enabled accessories can be displayed within stores for sale or otherwise made publicly accessible. It can therefore be important to prevent unauthorized reading of information from the accessory NFC circuit 110 by a person who, for example, seeks to obtain access to the content without purchasing the accessory.

Some embodiments of the present disclosure are directed to controlling how the accessory NFC circuit 110 is initially or subsequently activated. One or more of these embodiments can be used to prevent a person from using a UE or other NFC reader device to activate an accessory NFC circuit 110 to read information until actions are taken to allow such activation of the NFC circuit 110.

Shielding by a Removable Conductive Sticker

Figure 4:
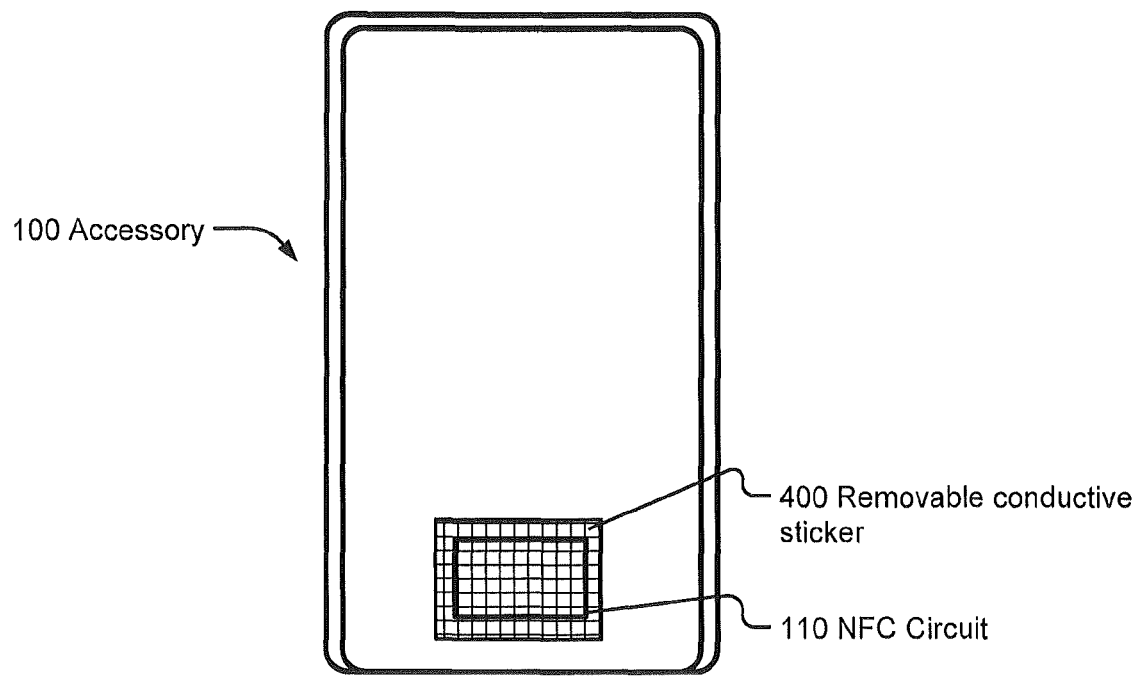
FIG. 4 illustrates a removable conductive sticker configured to shield the NFC circuit from other device NFC signals and prevent unauthorized activation of the NFC circuit, according to some embodiments.

FIG. 4 illustrates an accessory 100 having a NFC circuit 110. The NFC circuit 110 is covered by a removable conductive sticker 400 that is configured according to one embodiment and positioned over the NFC circuit 110 to shield the NFC circuit 110 from NFC signals generated by an adjacent NFC reader device. The conductive sticker 400 may include conductive (e.g., metal) mesh wiring or a conductive (e.g., metal) layer that extends across at least a major portion of the antenna 108, extends across the entire antenna 108, or extends across the entire NFC circuit 110 to shield the antenna 108 from NFC signals that are generated by an adjacent NFC reader device. The conductive portion of the sticker 400 may be electrically connected to a ground plane of the NFC circuit 110 to raise a voltage of the ground plane responsive to shielded NFC signals and, thereby, nullify any inductive coupling of the NFC signals to the antenna 108. The NFC circuit 110 can be enabled for activation by removing (e.g, peeling-off) the conductive sticker 400.

Removing the conductive sticker 400 eliminates the shielding and enables the NFC circuit 110 to be inductively powered by NFC signals from a NFC reader device. A user may therefore be instructed to remove the conductive sticker 400 after purchasing or otherwise receiving the accessory 100 to enable initial activation of the accessory NFC circuit 110. The conductive sticker 400 may be reinstalled, e.g., reattached to its original position, after the user has operated the UE 300 to read information from the accessory NFC circuit 110. Reinstalling the conductive sticker 400 can prevent an unauthorized other NFC reader device from reading information from the accessory NFC circuit 110 and, thereby, prevent unauthorized access to the applications, operational features, and/or other content authorized to the user by possession of the accessory 100.

Figure 5:
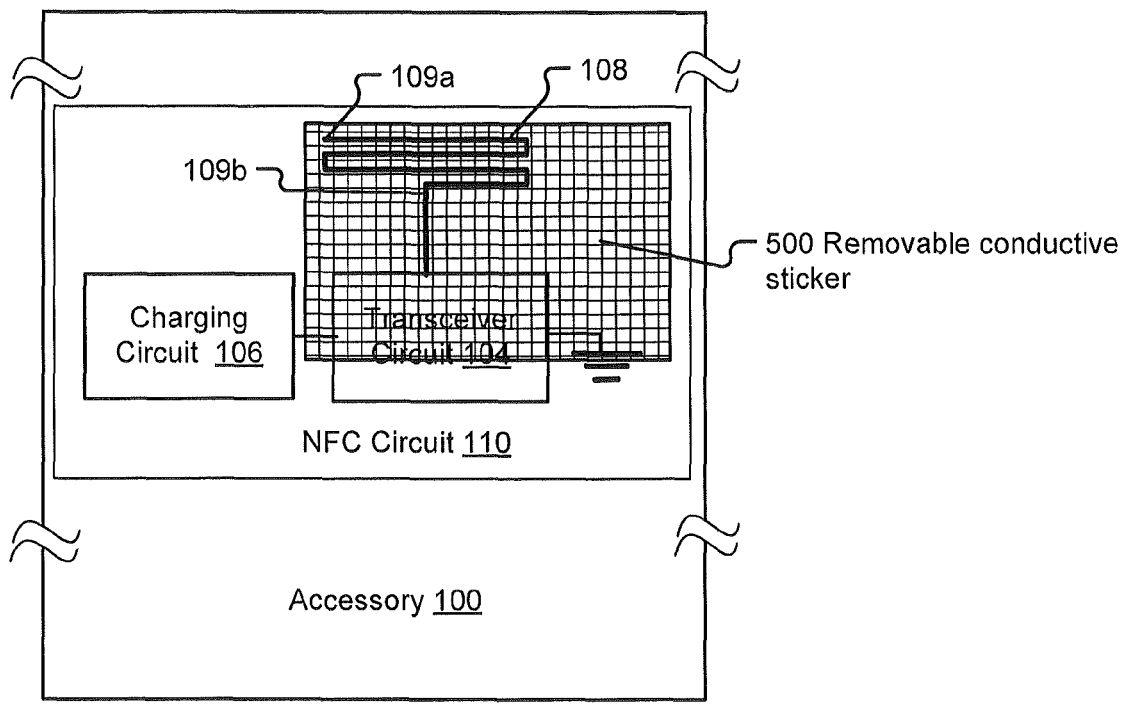
FIG. 5 illustrates another embodiment of a removable conductive sticker configured to short-circuit one or more components of the NFC circuit to prevent unauthorized activation of the NFC circuit, according to some embodiments.

FIG. 5 illustrates some other embodiments of a removable conductive sticker 500 that electrically connects to one or more locations on the antenna 108, a ground plane of the NFC circuit 100, and/or to another circuit node of the NFC circuit 100. The conductive sticker 500 may include conductive, e.g., metal, mesh wiring, a conductive, e.g., metal, layer, or conductive line. The conductive sticker 500 may electrically connect two locations on the antenna 108 to render the antenna 108 inoperable for receiving sufficient power from NFC signals from a NFC reader device to prevent operational powering of the NFC circuit 110. In one embodiment, the conductive sticker 500 connects an end portion 109a of the antenna 108 that is remote from the transceiver circuit 110 and another portion 109b of the antenna 108 that is adjacent to the transceiver circuit 104, thereby providing a short-circuit across the antenna 108. The antenna 108 may be covered by a protective layer but have one or more openings, e.g. via holes, exposed through the protective layer that are configured to allow electrical connection between the exposed portion(s) of the antenna 108 and the conductive sticker 500.

In another embodiment, the conductive sticker 500 electrically connects the antenna 108 to a ground plane of the NFC circuit 110 to short-circuit the antenna 108. Accordingly, the ground plane may also be covered by a protective layer having openings that expose a portion of the ground plane for electrical connection to the conductive sticker 500.

In another embodiment, the conductive sticker 500 electrically connects the antenna 108 to a circuit node between the transceiver circuit 104 and the charging circuit 106 to render the charging circuit 106 incapable of generating sufficient power to operate the NFC circuit 110.

Removing the conductive sticker 500 eliminates the electrical connection therethrough and enables inductive powering of the NFC circuit 110 by NFC signals from a NFC reader device, such as the user equipment 300. A user may therefore be instructed to remove the conductive sticker 500 after purchasing or otherwise receiving the accessory 100 to enable initial activation of the NFC circuit 110 of the accessory 100. The conductive sticker 500 may be reinstalled, e.g. reattached to its original position, after the user has operated the UE 300 to read information from the accessory NFC circuit 110. Reinstalling the conductive sticker 500 can prevent an unauthorized other NFC reader device from reading information from the accessory NFC circuit 110 and, thereby, prevent unauthorized access to the applications, operational features, and/or other content authorized to the user by possession of the accessory 100.

Conductive Bag for Shielding Accessory NFC Circuit

Figure 6:
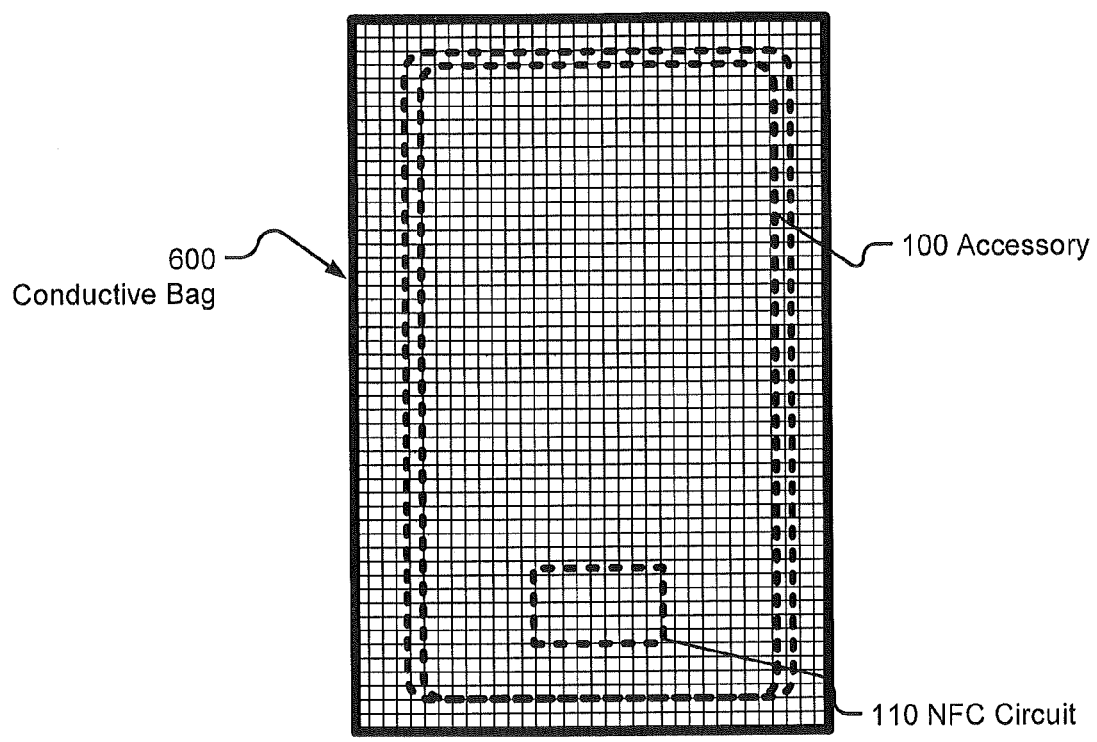
FIG. 6 illustrates a conductive bag configured according to some embodiments to shield an accessory NFC circuit from other device NFC signals while the accessory is contained in the conductive bag.

FIG. 6 illustrates the accessory 100 that is within a conductive bag 600. The conductive bag 600 may include conductive, e.g., metal, mesh wiring or a conductive (e.g., metal) layer that extends entirely around the NFC circuit 110 and may extend entirely around the accessory 100 residing within the conductive bag 600. The conductive bag 600 shields the NFC circuit 110 therein from NFC signals generated by a NFC reader device and, thereby, prevents operational powering of the NFC circuit 110. While the accessory 100 is within the conductive bag 600, a user cannot energize the NFC circuit 110 to receive information therefrom. Thus, the conductive bag 600 can prevent unauthorized access to (e.g., theft of) information from the NFC circuit 110 before the accessory 110 is purchased or other provided to an authorized user.

A user may therefore be instructed to remove the accessory 100 from the conductive bag 600 before attempting to operate the UE 300 to read or otherwise activate the accessory NFC circuit 110.

Accessory Configured as a Removable Film

Figure 7:
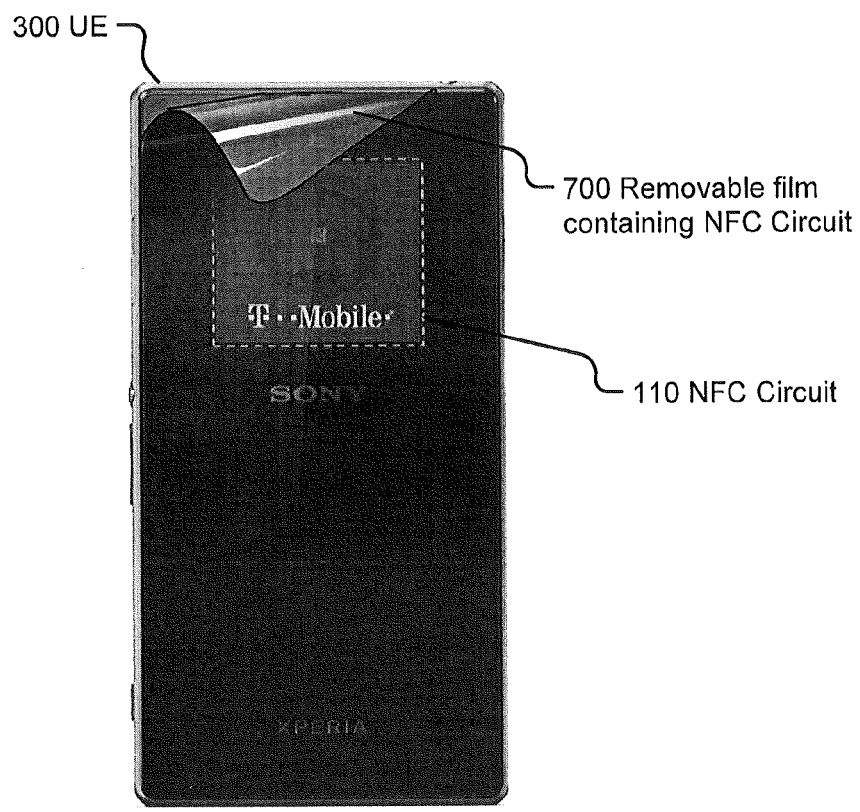
FIG. 7 illustrates a removable film that contains a NFC circuit and is attachable to a user equipment.

FIG. 7 illustrates a film 700 that can be removably attached to a major surface of the UE 300. The film 700 includes a NFC circuit 110. The NFC circuit 110 may be attached to the film 700, e.g., adhesively connected thereto, or may be at least partially disposed or entire enclosed within a material of the film 700.

In one embodiment, one surface of the film 700 has an adhesive or sticky surface that can adhere to a back surface of the UE 300, such a back surface that is opposite to a front surface having a display or user interface. A user may thereby adhere the film 700 to a surface of the UE 300 to enable the UE NFC circuit 310 to read information from the accessory NFC circuit 110.

The film NFC circuit 110 communicate information to the UE 300 is used to customize operation of the UE 300 and/or that is used by the UE 300 to obtain content from a content server through a communication network. For example, the film NFC circuit 110 may identify a set of parameters used by the UE 300 to customize operation for a geographic region of the world and/or to comply with telecommunication operator preferences. When the UE 300 is initially set up, it can read the parameters from the film NFC circuit 110 and control its initial setup responsive thereto. A user can be instructed to remove (e.g., peel off) the film 700 after completion of the initial UE setup to avoid potential interference from the film NFC circuit 110 when the NFC circuit 310 of the UE 300 communicates with other NFC communication devices.

Figure 8:
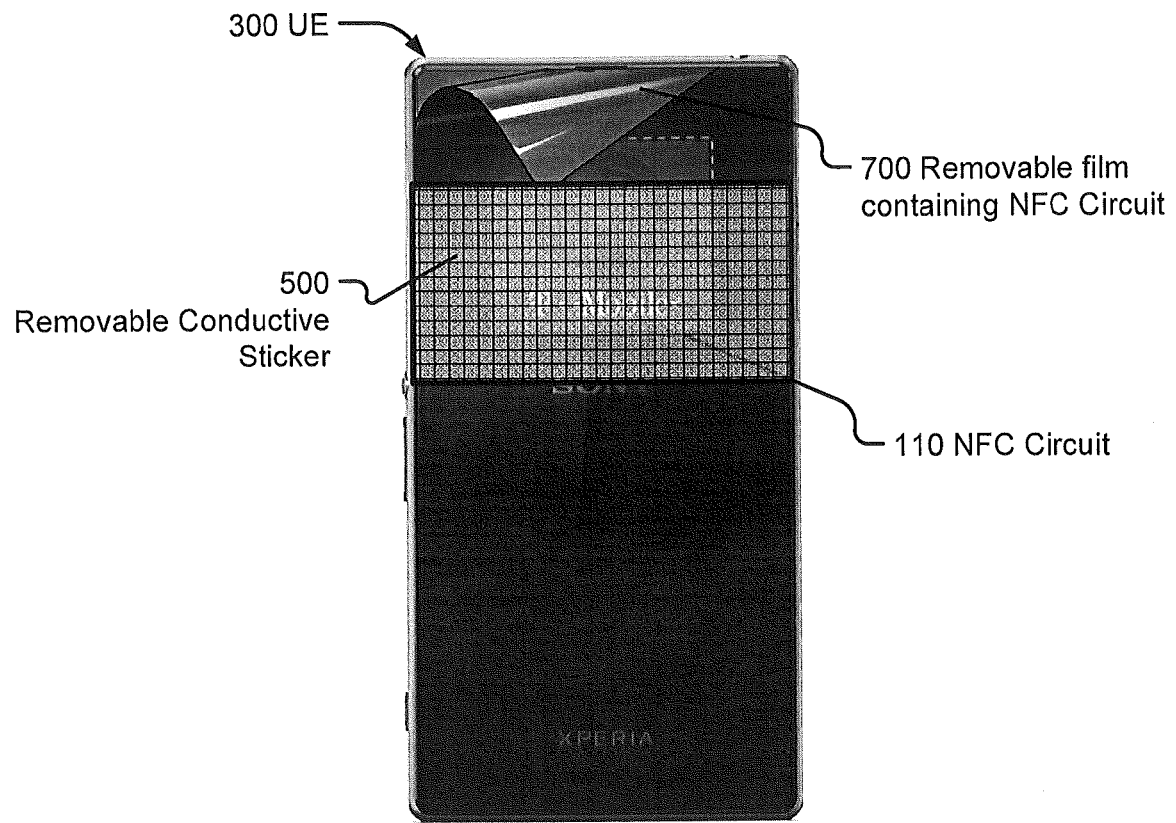
FIG. 8 illustrates a removable conductive sticker that is used to shield the NFC circuit of the film of FIG. 7 from other device NFC signals and prevent unauthorized activation of the NFC circuit, according to some embodiments.

FIG. 8 illustrates the film 700 applied to the UE 300 of FIG. 7. A conductive sticker 500 has been connected to the film to shield the accessory NFC circuit 110 from NFC signals from the UE 300 and/or from another NFC device. The conductive sticker 500 may be configured according to one or more of the embodiments of FIGS. 4 and 5.

The conductive sticker 500 may shield the NFC circuit 110 from NFC signals from a NFC reader device other than the 300 UE. For example, as shown in FIG. 8, the conductive sticker 500 may be on a side of the film 700 that is opposite to a side of the film 700 contacting the UE 300. The conductive sticker 500 can operate to shield the covered NFC circuit 110 from NFC signals from a NFC device which would need to penetrate through the conductive sticker 500 to energize the NFC circuit 110, while allowing the NFC circuit 110 to communicate with the NFC circuit 310 within the UE 300. Such operation may be advantageous to prevent/inhibit reading of information from the NFC circuit 110 by a device other than the UE 300.

The conductive sticker 500 may be configured to reduce the effective communication range of the NFC circuit 110 so as to reduce the ability of another NFC reader device to receive information from the NFC circuit 110 while the film 700 is attached to the UE 300. The conductive sticker 500 may, for example, electrically connect to one or more locations on the antenna 108 to reduce the effective length of the antenna 108 and/or inductive coupling efficiency of the antenna 108. The antenna 108 may be covered by material of the film 700, which material may be patterned to provide one or more openings exposing a location(s) on the antenna 108 that is electrically connectable to the conductive sticker 500. The one or more locations can be selected to enable the NFC circuit 310 of the UE 300 to communicate with the NFC circuit 110 of the film 700, while effectively preventing another further spaced apart NFC reader device from communicating with the NFC circuit 110 (e.g., prevent a NFC reader device more remote than the UE 300 from being able to operationally power the NFC circuit 110 through inductive coupling and/or prevent the NFC reader device from receiving information transmitted by the NFC circuit 110).

Point-of-Sale Communication of Information from NFC Enabled Accessory

Figure 9:
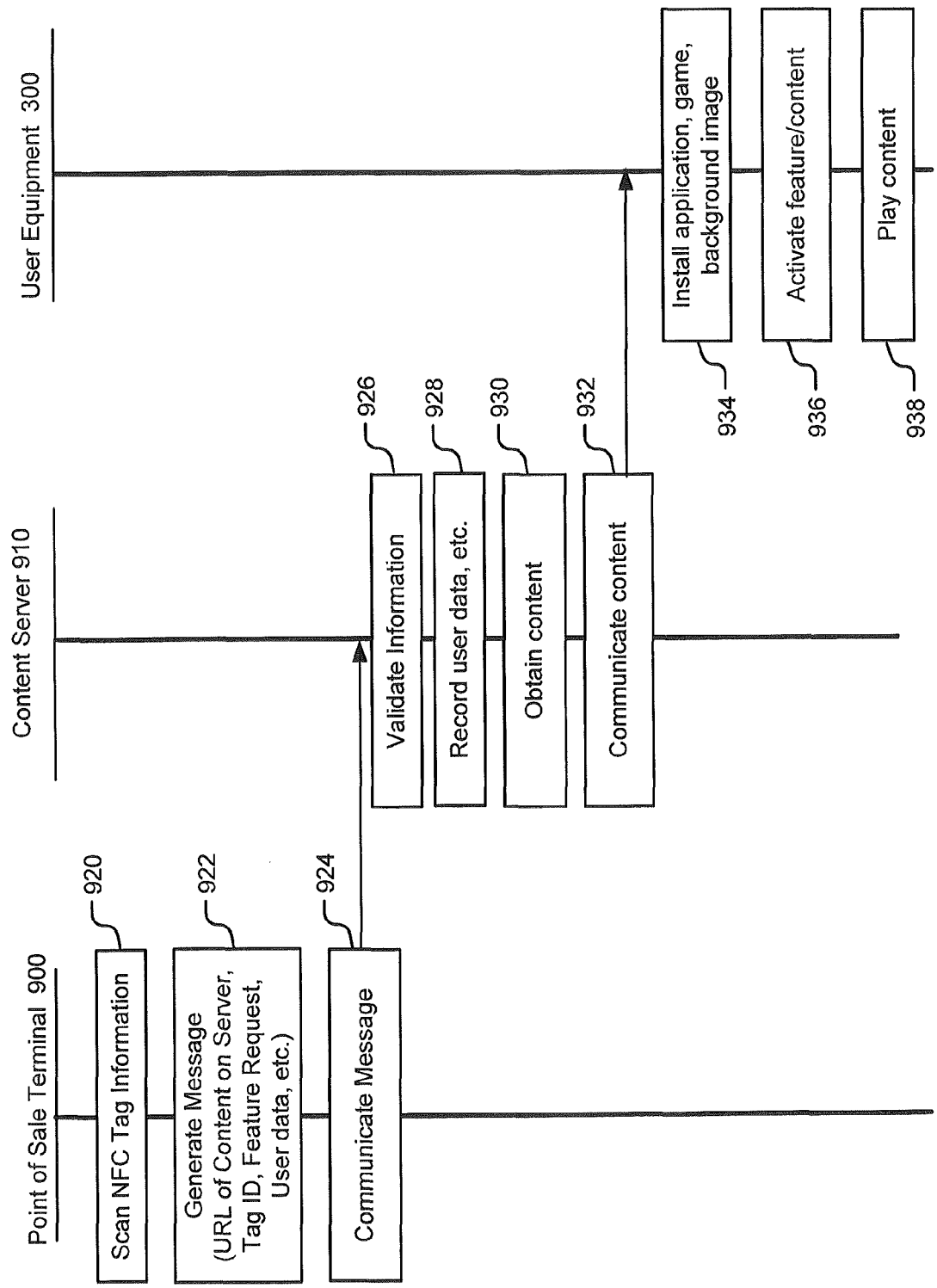
FIG. 9 illustrates a data flow diagram and flowchart of operations that can be performed by a point-of-sale terminal, a server, and a user equipment to obtain and use information from an accessory NFC circuit to provide an application, operational feature, and/or other content to the user equipment.

FIG. 9 illustrates a data flow diagram and flowchart of operations that can be performed by a point-of-sale terminal 900, a content server 910, and a UE 300 to obtain and use information from an accessory NFC circuit tag (NFC tag) to provide an application, operational feature, and/or content to the UE 300.

Referring to FIG. 9, the point-of-sale terminal 200, such as a retail sale checkout terminal, can be operated to scan (block 920) the NFC tag to obtain information therefrom. The point-of-sale terminal 900 generates (block 922), based on the information from the NFC tag, a message that can contain a URL to a location of an application, operational feature, and/or other content that is stored on the content server 910, a tag ID or unique identifier for the NFC tag, a request for a defined operational feature, user data that identifies contact information for the user and/or identifies the UE, such as a mobile terminal ID, network address, telephone number, etc. The point-of-sale terminal 900 communicates (block 924) the message to the content server 910.

The content server 910 may validate (block 926) information in the message to confirm that the UE 300 is authorized to receive content. If the information is not properly validated the operations can cease, otherwise the operations can continue by recording (block 928) user data and other information contained in the message to, for example, document what content has been provided to the UE 300. The content server 910 obtains (block 930) that content, which as explained above may include an application, authorization information to activate an operational feature, a movie, music, game, promotional information, discount coupon, etc. The content is communicated (block 932) to the user equipment 300.

Depending upon characteristics of the received content, the UE 300 may install (block 934) an application, game, background image, such as an image displayed as background in the display device 326 of the UE 300. The UE 300 may use data read from the NFC circuit 110 to set, change, or defined features of the application. The UE may activate (block 936) an operational feature provided by executable program code and/or may activate content that resides in or is downloaded to the UE 300. The UE may play (block 938) a movie, music, or other multimedia content that is downloaded and/or streamed from the content server 910.

Other communications may occur between the point of sale terminal 900 and the content server 910, and/or between the content server 910 and the user equipment 300 during the operations of blocks 920-938 and/or in addition to those operations to control access to and use of the content by the UE 300.

In some other embodiments, the point of sale terminal 900 obtains content from the content server 910 and writes the content to the accessory NFC circuit 110. The content can subsequently be transmitted from the accessory NFC circuit 110 to the UE 300 after the accessory 100 is connected to the UE 300.

In still some other embodiments, the point of sale terminal 900 activates or authorizes transfer of content from the accessory NFC circuit 110 to the UE 300. The point of sale terminal 900 writes information (e.g., authorization information) to the accessory NFC circuit 110 which authorizes or activates transfer of content from the accessory NFC circuit 110 to the UE 300. The accessory NFC circuit 110 can respond to being powered-on by the UE 300 during an attempt by the UE 300 to read content therefrom by determining whether the accessory NFC circuit 110 has received authorization information from the point of sale terminal 900. When the authorization information resides in the accessory NFC circuit 110, it transmits the content to the UE 300. Otherwise, when the authorization information does not reside in the accessory NFC circuit 110, it does not transmit the content to the UE 300.

In still some other embodiments, the point of sale terminal 900 writes authorization information or other data to the accessory NFC circuit 110 for subsequent relay to the UE 300. The point of sale terminal 900 may write a URL address to the accessory NFC circuit 110 which can be subsequently read by the UE 300 for use in obtaining content at a location on the content server 910 defined by the URL address. Alternatively or additionally, the point of sale terminal 900 may write an activation code as the authorization information to the accessory NFC circuit 110 which can be subsequently read by the UE 300 for use in obtaining access to (e.g., unlocking) content that resides on the UE 300.

Figure 10:
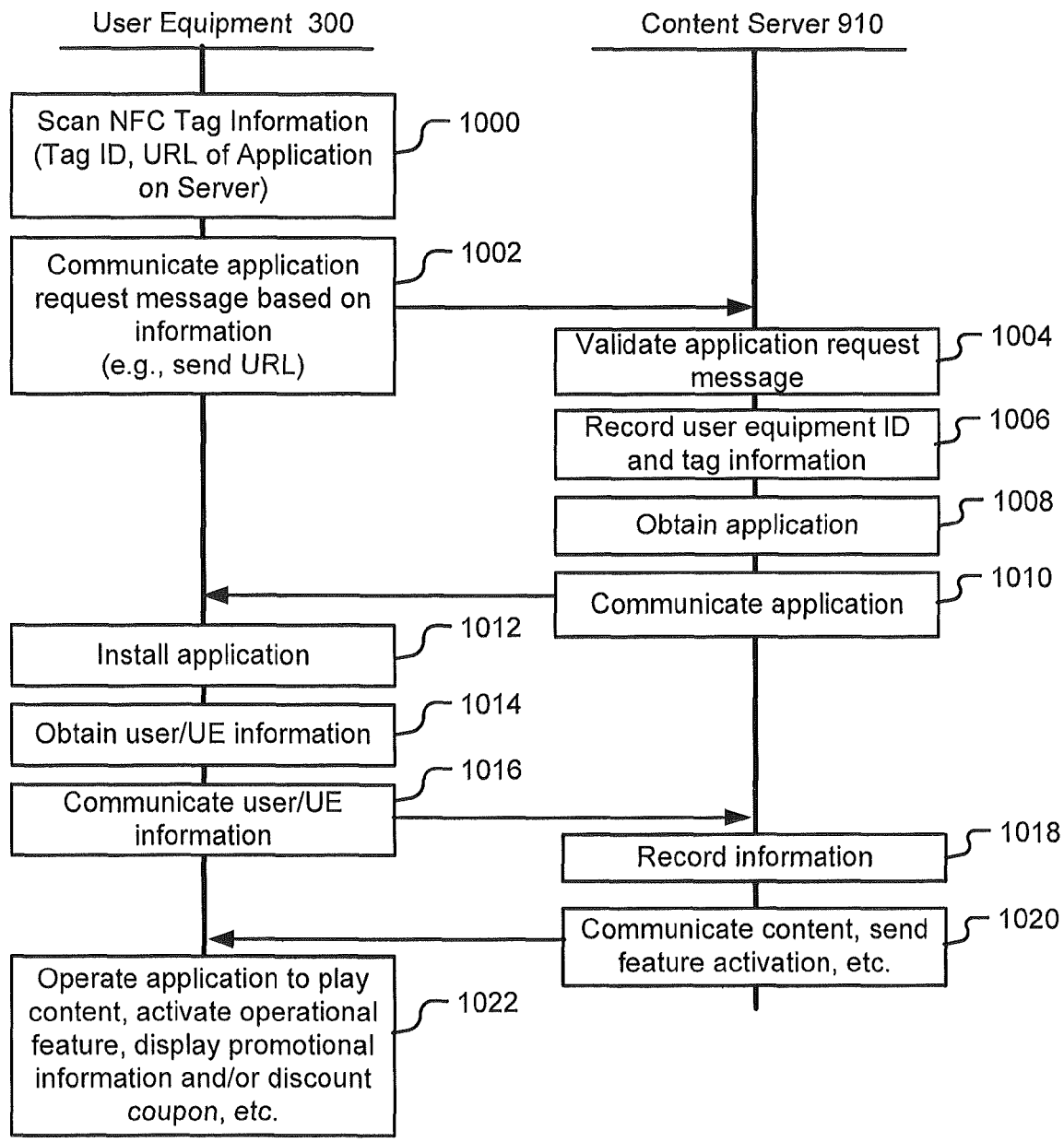
FIG. 10 illustrates a data flow diagram and flowchart of operations that can be performed by a user equipment and a server to obtain and use information from an accessory NFC circuit to provide an application, operational feature, and/or other content to the user equipment.

Controlling Application Installation and Content Operation Using NFC Enabled Accessories FIG. 10 illustrates a data flow diagram and flowchart of operations that can be performed by a UE 300 and a content server 910 to obtain and use information from an accessory NFC circuit to provide an application, operational feature, and/or other content to the UE 300.

Referring to FIG. 10, the UE 300 is operated to scan (block 1000) the NFC tag to obtain information therefrom. The UE 300 communicates (block 1002) an application request message based on the information from the NFC tag. The application request message may contain a URL to an application stored on the content server 910.

The content server 910 may validate (block 1004) information in the application request message to confirm that the UE 300 is authorized to receive an application. If the information is not properly validated the operations can cease, otherwise the operations can continue by recording (block 1006) a UE ID and/or information from the NFC tag to, for example, document what application will be provided to which UE. The content server 910 obtains (block 1008) the application. The application is communicated (block 1010) to the user equipment 300 (e.g., downloaded from an applications store).

The UE 300 installs (block 1012) and executes the application. Features of the application may be set, changed, or defined based on the content, such as to request location tracking, request access to user contact information, request access to communication interface(s), etc. The application obtains (block 1014) information relating to the user, the UE 300 (e.g., user login or other credentials, user name and/or contact information, unique UE identifier, etc.), and/or relating to a unique identifier obtained from the NFC tag, and communicates (block 1016) the information to the content server 910. The content server 910 can record (block 1018) the information and use the information to confirm that the UE 300 is authorized to receive content (e.g., hash the received information and compare to expected value) and to select among available content to be provided to the UE 300. The content server 910 communicates (block 1020) the content to the UE 300.

Depending upon characteristics of the received content, the application executed by the UE 300 can play the content (movie, music, game, multimedia content, etc.), use the content to activate an operational feature of the application, display a background image contained in the content (e.g., an image displayed as background in the display device 326 of the UE 300), display an electronic book contained in the content, display promotional information contained in the content, display a discount coupon contained in the content, etc.

One or more of the operations of blocks 1000-1022 may be performed once during initial downloading and playing of the content, or may be repetitively performed in response to each attempt by a user to play or otherwise use content through the UE 300. For example, operations of blocks 1000-1022 may be used to download and play a movie through an application on the UE 300, and then at least some of the operations of blocks 1000-1022 may be repeated when a user attempts to re-play the movie to confirm that NFC tag information is readable at that time. Thus, for example, a user may cease having authorization to play or otherwise use content when the NFC enabled cover is removed from the UE 300. The user may regain authorization to play or otherwise use content by reinstalling/attaching the NFC enabled cover to the UE 300 so that the NFC tag information can be properly scanned and used to enable use of the content. The NFC enabled cover or other accessory may thereby operate as a key that must be readable by the UE 300 to obtain continuing use of content.

Other communications may occur between the content server 910 and the user equipment 300 during the operations of blocks 1000-1022 and/or in addition to those operations to control access to and use of the content by the UE 300.

Further Operations and Methods for Using NFC Enabled Accessories to Control Retrieval of Content Stored on a Content Server and/or Authorize Use of Content Stored on the UE FIGS. 11-21 illustrate flowcharts of operations and methods that may be performed by an accessory NFC circuit to control a UE to retrieve content that is stored on a content server and/or to authorize use of content that is stored on the UE in accordance with some embodiments. FIG. 22-30 illustrate flowcharts of operations and methods that may be performed by a UE to retrieve content that is stored on a content server and/or to authorize use of content that is stored on the UE based on information obtained from an accessory NFC circuit in accordance with some embodiments. Although various operations and methods are described in the context of the accessory NFC circuit 110 and the UE 300 of any one or more of FIGS. 1-10, these methods and operations are not limited thereto and may be performed by other devices.

As explained above, the accessory 100 for a UE 300 can include a housing 102 that is configured to connect to the UE 300. For example, the accessory 100 may be a cover configured to snap-on or slide-on a UE. The accessory 100 includes an accessory NFC circuit 110 that is attached to the housing 102. The accessory NFC circuit 110 includes an antenna 108, a charging circuit 106, and a transceiver circuit 104. The antenna 108 is configured to inductively couple to signals emitted by a UE NFC circuit 310 within the UE 300. The charging circuit 106 is configured to output power provided by the inductive coupling through the antenna 108 to the signals emitted by the UE NFC circuit 310. Referring to the operational flowchart of FIG. 11, the transceiver circuit 104 is configured to be powered by the charging circuit 106 to transmit (block 1100), information to the UE NFC circuit 310 that will be used by the UE 300 to retrieve content stored on a content server 910 and/or to authorize use of content stored on the UE (e.g., content stored in the memory 322).

Figure 22:
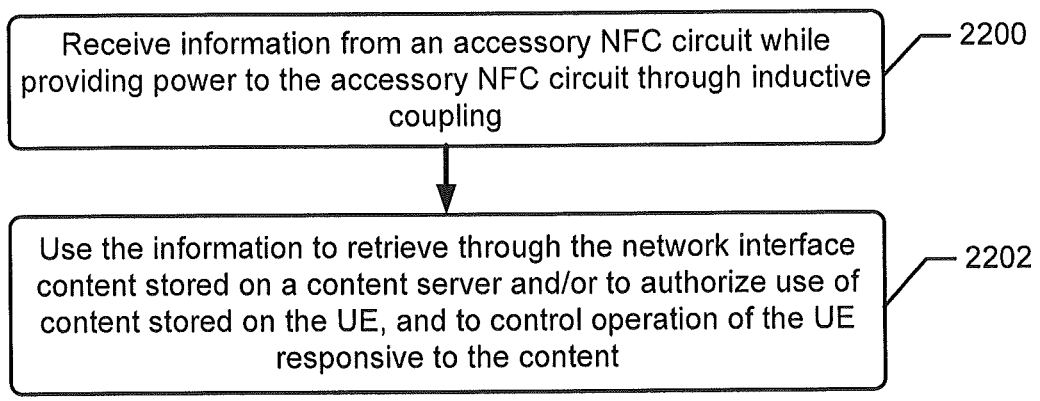
Figure 23:
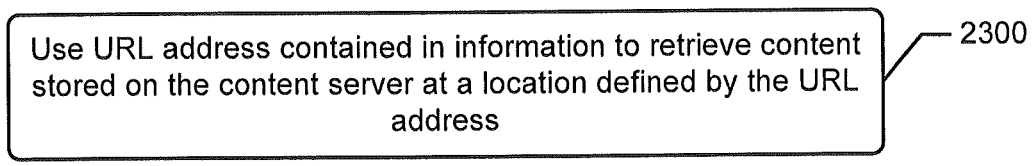
Figure 24:
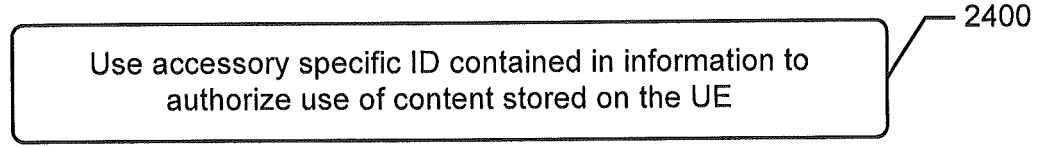

FIG. 22 illustrates corresponding operations and methods by a UE 300. As explained above, the UE 300 includes a UE NFC circuit 310, a network interface 330, and a processor 320. The UE NFC circuit 310 is configured to receive (block 2200) information from an accessory NFC circuit 110 while providing power to the accessory NFC circuit 110 through inductive coupling. The network interface 330 is configured to communicate with a network node, such as a content server 910 via a radio access node (e.g., cellular radio transceiver base station). The processor 320 is configured to use (block 2202) the information to retrieve through the network interface 330 content stored on the content server 910 and/or to authorize use of content stored on the UE (e.g., content stored in the memory 322), and to control operation of the UE 300 responsive to the content.

Thus, in one embodiment, the accessory is a cover containing a NFC circuit that can be attached to a cell phone, tablet computer, or other UE to provide information to the UE NFC circuit that enables the UE to obtain content from a content server through a data network (e.g., a private network and/or a public network such as the Internet) and/or to authorize use of content that may already be stored on the UE. The content can include, but is not limited to, movies, music (e.g., songs, ring tones, etc.), electronic books, television programs, games, discount coupons, promotional information, etc. By authorizing use of the content, a user may operate the UE to, for example, play a movie, music, and/or application program (e.g., game) which is provided by the content, and/or may operate the UE to obtain access to a discount coupon or other promotional information for the user's benefit. Without such authorization, the content may in some embodiments not be playable or otherwise accessible to a user.

The accessory NFC circuit 110 may transmit (block 1200 of FIG. 12) information containing a universal resource locator (URL) address of content stored on the content server 910. In a corresponding manner, the processor 320 of the UE 300 uses (block 2300 of FIG. 23) the received URL address to retrieve content stored on the content server 910 at a location defined by the URL address. Once the content is retrieved by the UE 300 into the local memory 322, a user may operate the UE 300 to, for example, play a movie, music, and/or application program (e.g., game) which is provided by the content.

The accessory NFC circuit 110 may transmit (block 1300 of FIG. 13) authorization information, which may contain an accessory specific identifier (ID) to the UE NFC circuit 310 that can be relayed by the UE to the content server to confirm that the UE is authorized to obtain the content. In a further embodiment, the accessory NFC circuit 110 may transmit (block 1400 of FIG. 14) an accessory specific identifier (ID), as content of the authorization information, that is unique from other accessory NFC circuits.

The accessory NFC circuit 110 may transmit (block 1500 of FIG. 15) the information containing an accessory specific identifier (ID) to the UE NFC circuit 310 to authorize use of content stored on the UE 300. In a corresponding manner, the processor 320 of the UE 300 uses (block 2400 of FIG. 24) the received accessory specific ID to authorize use of content stored on the UE 300.

The UE 300 may operate to revoke authorization for content responsive to detecting absence of the accessory NFC circuit 110. For example in the embodiment of FIG. 25, the UE processor 320 revokes (block 2500) authorization for the use of content on the UE 300 responsive to detecting an inability of the UE NFC circuit 310 to communicate with the accessory NFC circuit 110. Thus, for example, the user may be restricted to being able to play a movie, game, and/or music while a cover having the NFC circuit 110 remains attached to the UE 300. Removal of the cover causes the content to become disabled from further use by the UE 300.

The housing 102 may display visible branding relating to an online retailer or business partner thereof. The accessory transceiver circuit 110 can be configured to transmit the information to the UE NFC circuit 310 which the UE 300 can use to retrieve a discount coupon from the content server and/or to authorize use of a discount coupon stored on the UE 300 for use during an online purchase from the online retailer. For example, as explained above, an online retailer may sell or otherwise provide phone covers having visible, e.g., printed, branding relating to the online retailer or partner thereof and which includes a NFC circuit 110 that transmits information used by the UE 300 to download a retail application from a content server 910, and which further provides a discount coupon that be used when purchasing through the online retailer.

Counting Power-on Cycles to Control when Information is Transmitted from an Accessory NFC Circuit In some embodiments the accessory NFC circuit 110 transmits different URL addresses and/or different activation codes depending upon a number of power-on cycles it has experienced. In the embodiment of FIG. 16, the accessory NFC circuit further includes a counter 350 (FIG. 3) that is configured to count power-on cycles of the accessory NFC circuit 110. The accessory transceiver circuit 104 is configured to select (block 1600) a URL address from among a group of URL addresses defined in the accessory NFC circuit 110 based on the count and/or to select (block 1600) an activation code from among a group of activation codes defined in the accessory NFC circuit 110 based on the count, and to transmit (block 1602) the selected URL address and/or to transmit (block 1602) the selected activation code to the UE NFC circuit 310 that will be used by the UE 300 to retrieve content stored on the content server and/or to authorize use of content stored on the UE 300.

These operations may be beneficially used to reward users with different content and/or features as the accessory 100 remains attached or otherwise connected to the UE 300 and is repetitively power cycled on and off over time. These operations may additionally or alternatively be beneficial for constraining which content and/or features are available over time for use on the UE 300.

In a further embodiment of FIG. 17, the accessory transceiver circuit 104 is configured to transmit (block 1700) a first URL address and/or to transmit a first activation code when the count satisfies a defined relationship to a threshold value (e.g., is less than or is greater than), and to transmit (block 1700) a second URL address different from the first URL address and/or transmit a second activation code different from the first activation code when the count does not satisfy the defined relationship to the threshold value (e.g., is greater than or is less than).

In another embodiment shown in FIG. 18, the accessory transceiver circuit 104 is configured to transmit the information when the count satisfies a defined relationship to a threshold value (e.g., is less than or is greater than) and to prevent transmission of the information when the count does not satisfy the defined relationship to the threshold value (e.g., is greater than or is less than). Thus, the accessory NFC circuit 110 may wait a defined threshold number of power-on cycles before transmitting information or may alternatively transmit information each time it is powered-on until a defined threshold number of the power-on cycles has occurred.

Counting Number of Different UEs Obtained Information from the Accessory NFC Circuit to Select Different URLs or Activation Codes for Transmission from the Accessory NFC Circuit In some embodiments the accessory NFC circuit 110 transmits different URL addresses and/or different activation codes depending upon how many different UEs have obtained information from the accessory NFC circuit 110. In the embodiment of FIG. 19, the accessory NFC circuit 110 further includes a counter 350 that is configured to count a number of different UEs 300 that have powered the accessory NFC circuit 110 to obtain information transmitted by the transmitter. The accessory transceiver circuit 104 is configured to select (block 1900) a URL address from among a group of URL addresses defined in the accessory NFC circuit 110 based on the count and/or to select (block 1900) an activation code from among a group of activation codes defined in the accessory NFC circuit 110 based on the count. The accessory transceiver circuit 104 transmits (block 1902) the selected URL address and/or transmits (block 1902) the selected activation code to the UE NFC circuit 310 for use by the UE 300 to retrieve content stored on the content server and/or authorize use of content stored on the UE 300.

In another related embodiment shown in FIG. 20, the accessory transceiver circuit 104 is configured to transmit (block 2000) a first URL address and/or to transmit (block 2000) a first activation code when the count, of the number of different UEs 300 that have powered the accessory NFC circuit 110 to obtain information transmitted by the transmitter, satisfies a defined relationship to a threshold value. The accessory transceiver circuit 104 transmits (block 2000) a second URL address different from the first URL address and/or transmits (block 2000) a second activation code different from the first activation code when the count does not satisfy the defined relationship to the threshold value.

Figure 21:
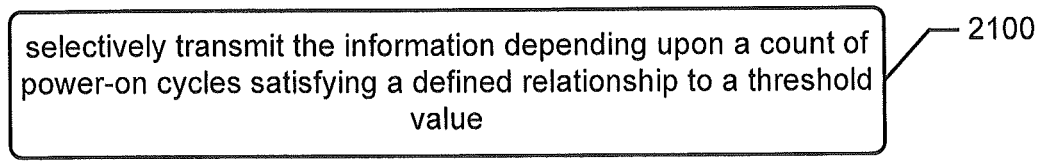

The accessory NFC circuit 110 may count a number of different UEs 300 that have read information from the accessory NFC circuit 110 and use the count to provide different URLs or activation codes over time, or to control when a URL or activation code is transmitted. These operations can be used to limit sharing of URLs and/or activation codes to a defined number of UEs, and/or to encourage sharing by activating URLs and/or activation codes only once a threshold amount of sharing has occurred. In the embodiment of FIG. 21, the counter 350 counts a number of different UEs that have powered the accessory UE to obtain information transmitted by the transmitter. The accessory transceiver circuit 104 selectively transmits (block 2100) the information depending upon the count satisfying a defined relationship to a threshold value (e.g., is less than, is equal to, or is greater than).

Figure 30:
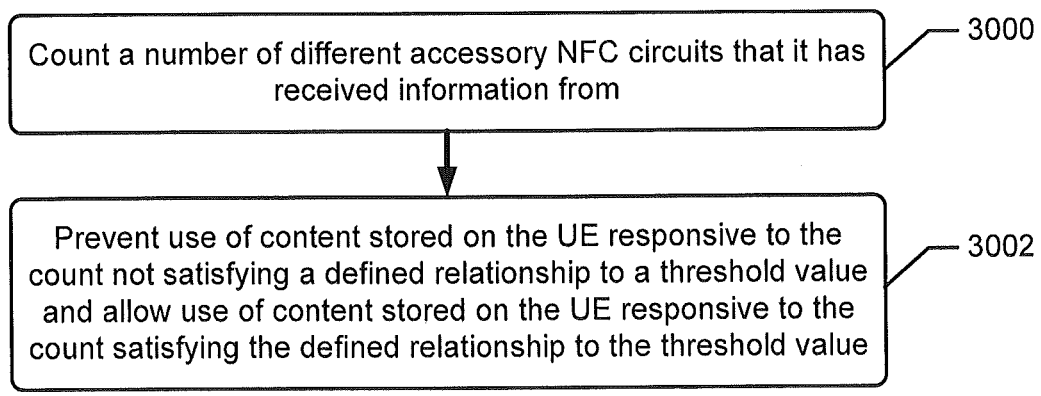

Related operations and methods that may be performed by a UE 300 are illustrated in FIG. 30. Referring to FIG. 30, the UE processor 320 counts (block 3000) a number of different accessory NFC circuits that it has received information from. The UE processor 320 prevents use of content stored on the UE responsive to the count not satisfying a defined relationship to a threshold value and allows use of content stored on the UE responsive to the count satisfying the defined relationship to the threshold value. Thus, for example, the UE 300 may limit sharing of URLs and/or activation codes to a defined number of UEs, and/or to encourage sharing by activating URLs and/or activation codes only once a threshold amount of sharing has occurred.

UE Selects Among URLs or Activation Codes Based on Number of Accessory NFC Circuits it has Received Information from The UE 300 can receive a plurality of different URLs or activation codes from the accessory NFC circuit 110. The UE 300 can count a number of other accessory NFC circuits that it has read, and can select among the different URLs or activation codes based on the count. This may be used to encourage consumers to share their URL or activation code with other UEs in order to earn content or unlock features, which can be used to encourage peer-to-peer marketing of a product/service.

In the embodiment of FIG. 26, the UE processor 320 is configured to count (block 2600) a number of different accessory NFC circuits that it has received information from. The processor 320 selects (block 2602) a URL address from among a group of URL addresses available in the UE 300 based on the count. The processor 320 uses (block 2604) the selected URL address to retrieve through the network interface content stored on the content server 910 at a location defined by the URL address.

In the embodiment of FIG. 27, the UE processor 320 is configured to count (block 2700) a number of different accessory NFC circuits that it has received information from. The processor 320 selects (block 2702) an activation code from among a group of activation codes available in the UE 300 based on the count. The processor 320 uses (block 704) the selected activation code to authorize use of content stored on the UE. The processor 320 may then execute, display, and/or otherwise use the content once authorized, and may prevent execution, display, and/or other use before that authorization.

UE Obtains or Authorizes Content Based on Combination of URLs or Activation Codes Received from Different Accessory NFC Circuits The UE 300 can receive a plurality of different URLs or activation codes from a plurality of different accessory NFC circuits, and can obtain and/or authorize content based on a combination of the URLs and/or activation codes that are received. These operations and methods may be used to encourage consumers to share their URL or activation code with other UEs in order to earn content or unlock features, which can be used to encourage peer-to-peer marketing of a product/service.

Figure 28:
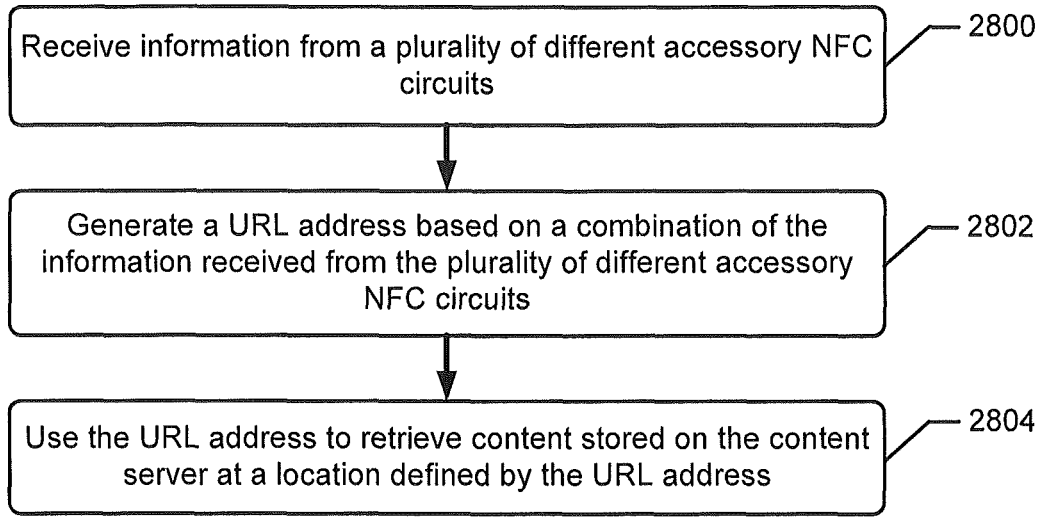

In the embodiment of FIG. 28, the UE processor 320 receives (block 2800) information from a plurality of different accessory NFC circuits. The processor 320 generates (block 2802) a URL address based on a combination of the information received from the plurality of different accessory NFC circuits. The processor 320 uses (block 2804) the URL address to retrieve content stored on the content server 910 at a location defined by the URL address. The information may, for example, be portions of a URL address that can be combined to generate a complete URL address that is used to obtain content.

Figure 29:
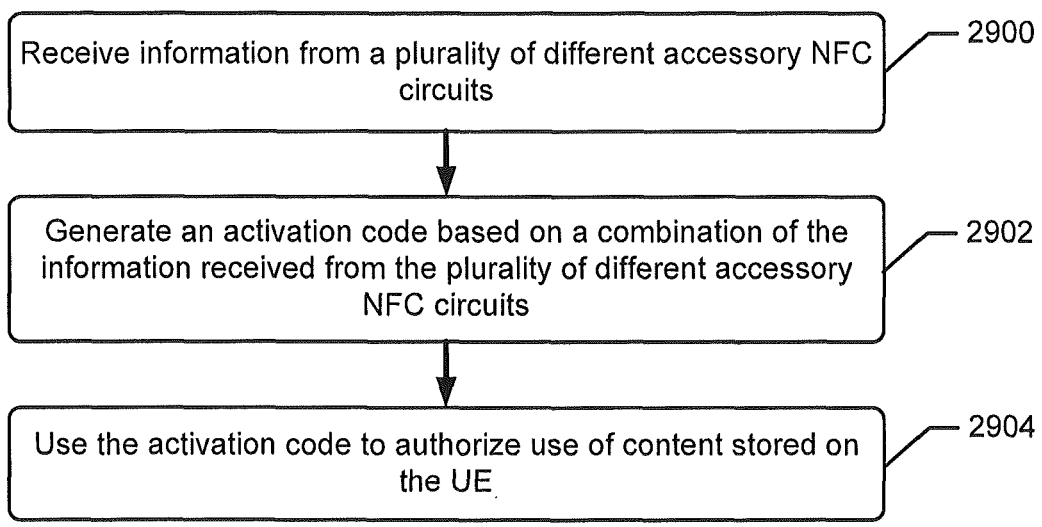

An alternative embodiment of FIG. 29, the UE processor 320 receives (block 2900) information from a plurality of different accessory NFC circuits. The processor 320 generates (block 2902) an authorization code based on a combination of the information received from the plurality of different accessory NFC circuits. The processor 320 uses (block 2904) the authorization code to authorize use of content stored on the UE 300. The information may may be portions of an authorization code that can be combined to generate a complete authorization code which is used to determine that the UE 300 is authorized to use associated content.

Further Definitions and Embodiments:

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. An accessory for a user equipment (UE), the accessory comprising:
a housing configured to connect to the UE; and
an accessory near field communication (NFC) circuit attached to the housing and comprising:
an antenna configured to inductively couple to signals emitted by a UE NFC circuit within the UE;
a charging circuit configured to output power provided by the inductive coupling through the antenna to the signals emitted by the UE NFC circuit;
a transceiver circuit configured to be powered by the charging circuit to transmit information to the UE NFC circuit that will be used by the UE to retrieve content stored on a content server and/or to authorize use of content stored on the UE; and
a counter configured to count power-on cycles of the accessory NFC circuit,
wherein the transceiver circuit is configured to select a universal resource locator (URL) address from among a group of URL addresses defined in the accessory NFC circuit based on the count and/or to select an activation code from among a group of activation codes defined in the accessory NFC circuit based on the count, and to transmit the selected URL address and/or the selected activation code to the UE NFC circuit for use by the UE to retrieve content stored on the content server and/or authorize use of content stored on the UE.

2. An accessory for a user equipment (UE), the accessory comprising:
a housing configured to connect to the UE; and
an accessory near field communication (NFC) circuit attached to the housing and comprising:
an antenna configured to inductively couple to signals emitted by a UE NFC circuit within the UE;
a charging circuit configured to output power provided by the inductive coupling through the antenna to the signals emitted by the UE NFC circuit;
a transceiver circuit configured to be powered by the charging circuit to transmit information to the UE NFC circuit that will be used by the UE to retrieve content stored on a content server and/or to authorize use of content stored on the UE; and
a counter configured to count power-on cycles of the accessory NFC circuit; and
wherein the transceiver circuit is configured to transmit a first universal resource locator (URL) address and/or to transmit a first activation code when the count satisfies a defined relationship to a threshold value, and to transmit a second URL address different from the first URL address and/or transmit a second activation code different from the first activation code when the count does not satisfy the defined relationship to the threshold value.

3. The accessory of claim 2, wherein:
the housing displays visible branding relating to an online retailer or business partner thereof; and
the transceiver circuit is configured to transmit the information to the UE NFC circuit which the UE can use to retrieve a discount coupon from the content server and/or to authorize use of a discount coupon stored on the UE for use during an online purchase from the online retailer.

4. An accessory for a user equipment (UE), the accessory comprising:
a housing configured to connect to the UE; and
an accessory near field communication (NFC) circuit attached to the housing and comprising:
an antenna configured to inductively couple to signals emitted by a UE NFC circuit within the UE;
a charging circuit configured to output power provided by the inductive coupling through the antenna to the signals emitted by the UE NFC circuit;
a transceiver circuit configured to be powered by the charging circuit to transmit information to the UE NFC circuit that will be used by the UE to retrieve content stored on a content server and/or to authorize use of content stored on the UE; and
a counter configured to count power-on cycles of the accessory NFC circuit; and
wherein the transceiver circuit is configured to transmit the information when the count satisfies a defined relationship to a threshold value and to prevent transmission of the information when the count does not satisfy the defined relationship to the threshold value.

5. The accessory of claim 4, wherein the housing forms a cover configured to protect a surface of the UE and/or forms a stand that supports and holds the UE in a defined orientation.

6. The accessory of claim 4, wherein:
the transceiver circuit is configured to transmit the information to the UE NFC circuit which contains a universal resource locator (URL) address that will be used by the UE to retrieve content stored on the content server at a location defined by the URL address.

7. The accessory of claim 6, wherein:
the accessory transceiver circuit is configured to transmit authorization information to the UE NFC circuit that can be relayed by the UE to the content server to confirm that the UE is authorized to obtain the content.

8. The accessory of claim 7, wherein:
the authorization information comprises an accessory specific identifier (ID) that is unique from other accessory NFC circuits and can be relayed by the UE to the content server to confirm that the UE is authorized to obtain the content.

9. The accessory of claim 4, wherein:
the transceiver circuit is configured to transmit the information which contains an accessory specific identifier (ID) to the UE NFC circuit to authorize use of content stored on the UE.

10. The accessory of claim 4, wherein:
the antenna is configured to inductively couple to signals emitted by a point-of-sale NFC circuit within a point-of-sale terminal; and
the transceiver circuit is configured to receive and store the information from the point-of-sale NFC circuit for subsequent transmittal to the UE.

11. An accessory for a user equipment (UE), the accessory comprising:
a housing configured to connect to the UE; and
an accessory near field communication (NFC) circuit attached to the housing and comprising:
an antenna configured to inductively couple to signals emitted by a UE NFC circuit within the UE;
a charging circuit configured to output power provided by the inductive coupling through the antenna to the signals emitted by the UE NFC circuit;
a transceiver circuit configured to be powered by the charging circuit to transmit information to the UE NFC circuit that will be used by the UE to retrieve content stored on a content server and/or to authorize use of content stored on the UE; and a counter configured to count a number of different UEs that have powered the accessory NFC circuit to obtain information transmitted by the transmitter; and wherein the transceiver circuit is configured to select a universal resource locator (URL) address from among a group of URL addresses based on the count and/or to select an activation code from among a group of activation codes based on the count, and to transmit the selected URL address and/or the selected activation code to the UE NFC circuit that will be used by the UE to retrieve content stored on the content server and/or to authorize use of content stored on the UE.

12. An accessory for a user equipment (UE), the accessory comprising:
a housing configured to connect to the UE; and
an accessory near field communication (NFC) circuit attached to the housing and comprising:
an antenna configured to inductively couple to signals emitted by a UE NFC circuit within the UE;
a charging circuit configured to output power provided by the inductive coupling through the antenna to the signals emitted by the UE NFC circuit;
a transceiver circuit configured to be powered by the charging circuit to transmit information to the UE NFC circuit that will be used by the UE to retrieve content stored on a content server and/or to authorize use of content stored on the UE; and
a counter configured to count a number of different UEs that have powered the accessory UE to obtain information transmitted by the transmitter,
wherein the transceiver circuit is configured to transmit a first universal resource locator (URL) address and/or to transmit a first activation code when the count satisfies a defined relationship to a threshold value, and to transmit a second URL address different from the first URL address and/or to transmit a second activation code different from the first activation code when the count does not satisfy the defined relationship to the threshold value.

13. An accessory for a user equipment (UE), the accessory comprising:
a housing configured to connect to the UE; and
an accessory near field communication (NFC) circuit attached to the housing and comprising:
an antenna configured to inductively couple to signals emitted by a UE NFC circuit within the UE;
a charging circuit configured to output power provided by the inductive coupling through the antenna to the signals emitted by the UE NFC circuit;
a transceiver circuit configured to be powered by the charging circuit to transmit information to the UE NFC circuit that will be used by the UE to retrieve content stored on a content server and/or to authorize use of content stored on the UE; and
a counter configured to count a number of different UEs that have powered the accessory UE to obtain information transmitted by the transmitter,
wherein the transceiver circuit is configured to selectively transmit the information depending upon the count satisfying a defined relationship to a threshold value.

14. A user equipment (UE) comprising:
a UE near field communication (NFC) circuit configured to receive information from an accessory NFC circuit while providing power to the accessory NFC circuit through inductive coupling;
a network interface configured to communicate with a network node; and
a processor configured to use the information to receive through the network interface content stored on a content server and/or to authorize use of content stored on the UE, and to control operation of the UE responsive to the content,
wherein the processor is configured to count a number of different accessory NFC circuits that it has received information from, to select a universal resource locator (URL) address from among a group of URL addresses available in the UE based on the count, and to use the selected URL address to retrieve through the network interface content stored on the content server at a location defined by the URL address.

15. The UE of claim 14, wherein:
the information received by the UE NFC circuit from the accessory NFC circuit contains a universal resource locator (URL) address; and
the processor uses the URL address to retrieve content stored on the content server at a location defined by the URL address.

16. A user equipment (UE) comprising:
a UE near field communication (NFC) circuit configured to receive information from an accessory NFC circuit while providing power to the accessory NFC circuit through inductive coupling;
a network interface configured to communicate with a network node; and
a processor configured to use the information to retrieve through the network interface content stored on a content server and/or to authorize use of content stored on the UE, and to control operation of the UE responsive to the content,
wherein the processor is configured to count a number of different accessory NFC circuits that it has received information from, to select an activation code from among a group of activation codes available in the UE based on the count, and to use the selected activation code to authorize use of content stored on the UE.

17. A user equipment (UE) comprising:
a UE near field communication (NFC) circuit configured to receive information from an accessory NFC circuit while providing power to the accessory NFC circuit through inductive coupling;
a network interface configured to communicate with a network node; and
a processor configured to use the information to retrieve through the network interface content stored on a content server and/or to authorize use of content stored on the UE, and to control operation of the UE responsive to the content,
wherein the UE NFC circuit receives information from a plurality of different accessory NFC circuits; and
wherein the processor is configured to generate a URL address based on a combination of the information received from the plurality of different accessory NFC circuits, and to use the URL address to retrieve content stored on the content server at a location defined by the URL address.

18. A user equipment (UE) comprising:
a UE near field communication (NFC) circuit configured to receive information from an accessory NFC circuit while providing power to the accessory NFC circuit through inductive coupling;
a network interface configured to communicate with a network node; and a processor configured to use the information to retrieve through the network interface content stored on a content server and/or to authorize use of content stored on the UE, and to control operation of the UE responsive to the content, wherein the UE NFC circuit receives information from a plurality of different accessory NFC circuits; and wherein the processor is configured to generate an activation code based on a combination of the information received from the plurality of different accessory NFC circuits, and to use the activation code to authorize use of content stored on the UE.

19. A user equipment (UE) comprising:
a UE near field communication (NFC) circuit configured to receive information from an accessory NFC circuit while providing power to the accessory NFC circuit through inductive coupling;
a network interface configured to communicate with a network node; and
a processor configured to use the information to retrieve through the network interface content stored on a content server and/or to authorize use of content stored on the UE, and to control operation of the UE responsive to the content, wherein the processor is configured to count a number of different accessory NFC circuits that it has received information from, to prevent use of content stored on the UE responsive to the count not satisfying a defined relationship to a threshold value and to allow use of content stored on the UE responsive to the count satisfying the defined relationship to the threshold value.

20. The UE of claim 19, wherein:
the information received by the UE NFC circuit from the accessory NFC circuit contains an accessory specific identifier (ID); and
the processor uses the accessory specific ID to authorize use of content stored on the UE.

21. The UE of claim 20, wherein:
the processor revokes authorization of use of the content responsive to detecting an inability of the UE NFC circuit to communicate with the accessory NFC circuit.

* * * * *